(12) United States Patent
Itou

(10) Patent No.: US 11,233,258 B2
(45) Date of Patent: Jan. 25, 2022

(54) CONTROL DEVICE FOR POWER CONVERTER AND FUEL CELL SYSTEM

(71) Applicant: TOYOTA JIDOSHA KABUSHIKI KAISHA, Toyota (JP)

(72) Inventor: Masayuki Itou, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/941,234

(22) Filed: Jul. 28, 2020

(65) Prior Publication Data
US 2021/0111419 A1    Apr. 15, 2021

(30) Foreign Application Priority Data

Oct. 15, 2019 (JP) .............................. JP2019-188767

(51) Int. Cl.
*H01M 8/04858* (2016.01)
*H01M 8/04828* (2016.01)
(Continued)

(52) U.S. Cl.
CPC .......... *H01M 8/0491* (2013.01); *B60L 58/40* (2019.02); *H01M 8/0488* (2013.01); *H01M 8/0494* (2013.01); *H01M 8/04731* (2013.01); *H02M 3/1584* (2013.01); *B60L 2210/14* (2013.01); *H01M 2250/20* (2013.01)

(58) Field of Classification Search
CPC .......... B60L 2210/14; B60L 2240/525; B60L 2240/529; B60L 50/72; B60L 58/12; B60L 58/33; B60L 58/40; H01M 2250/20; H01M 8/04029; H01M 8/04731; H01M 8/04738; H01M 8/0488; H01M 8/0491; H01M 8/0494; H02M 1/327; H02M 3/003; H02M 3/1584; H02M 3/1586; Y02E 60/50; Y02T 10/70; Y02T 90/40

See application file for complete search history.

(56) References Cited

U.S. PATENT DOCUMENTS

| | | | |
|---|---|---|---|
| 2012/0306292 A1 | 12/2012 | Imanishi et al. | |
| 2016/0001660 A1* | 1/2016 | Tomura | B60L 58/20 307/10.1 |
| 2019/0058411 A1 | 2/2019 | Kitamoto | |

FOREIGN PATENT DOCUMENTS

| | | |
|---|---|---|
| JP | 2019/103244 | 6/2019 |
| WO | WO 2012/164658 | 12/2012 |
| WO | WO 2017/145305 | 8/2017 |

* cited by examiner

*Primary Examiner* — Adam A Arciero
(74) *Attorney, Agent, or Firm* — Finnegan, Henderson, Farabow, Garrett & Dunner, LLP

(57) ABSTRACT

In a control device for a power converter converting electric power of a fuel cell stack, the power converter includes first and second reactors, a first switching element connected to the first reactor, and a second switching element connected to the second reactor. The second reactor is located closer to a cooling water discharge manifold than the first reactor. The control device configured to: set first and second duty cycles of the first and second switching element; and execute limit control in which, by controlling the setting of the first and second duty cycles, a second amount of heat generated by the second reactor due to a second current is limited to a value smaller than a first amount of heat generated by the first reactor due to a first current within a period of at least multiple ON-OFF cycles of the first and second switching elements.

11 Claims, 13 Drawing Sheets

(51) Int. Cl.
*H02M 3/158* (2006.01)
*B60L 58/40* (2019.01)
*H01M 8/04701* (2016.01)

CONTROL DEVICE FOR POWER CONVERTER AND FUEL CELL SYSTEM

INCORPORATION BY REFERENCE

The disclosure of Japanese Patent Application No. 2019-188767 filed on Oct. 15, 2019 including the specification, drawings and abstract is incorporated herein by reference in its entirety.

BACKGROUND

1. Technical Field

The disclosure relates to control devices for power converters and fuel cell systems.

2. Description of Related Art

Power converters having a plurality of reactors are known as power converters that convert output power of a fuel cell stack (see, e.g., International Patent Publication No. WO 2017/145305).

SUMMARY

The reactors may be disposed near the fuel cell stack due to, e.g., limitations on mounting space etc. In this case, the reactors may become hot due to the heat from the fuel cell stack and may also become hot due to the heat generated by the reactors themselves, which may affect reliability.

The fuel cell stack has a temperature gradient. Depending on the positional relationship between the fuel cell stack and these reactors, a part of the reactors becomes hot and affects reliability, while the remainder does not become hot and does not affect reliability.

The disclosure provides a control device for a power converter which reduces an increase in temperature of a reactor disposed near a fuel cell stack, and a fuel cell system.

A first aspect of the disclosure relates to a control device for a power converter that converts electric power of a fuel cell stack. The fuel cell stack includes a cell stack of a plurality of single cells and a cooling water discharge manifold through which cooling water is discharged from the cell stack. The cooling water discharge manifold is a through hole extending through the cell stack in a direction in which the single cells are stacked. The power converter includes a first reactor and a second reactor which are connected in parallel with each other to the fuel cell stack, a first switching element connected to the first reactor, and a second switching element connected to the second reactor. The second reactor is located closer to the cooling water discharge manifold than the first reactor is. The control device configured to: set a first duty cycle of the first switching element and a second duty cycle of the second switching element; and execute limit control. The limit control is control in which, by controlling the setting of the first duty cycle and the second duty cycle, a second amount of heat that is generated by the second reactor due to a second current flowing through the second reactor is limited to a value smaller than a first amount of heat that is generated by the first reactor due to a first current flowing through the first reactor within a period of at least a plurality of ON-OFF cycles of the first switching element and the second switching element.

The second reactor is located closer to the cooling water discharge manifold than the first reactor is. The second reactor therefore receives a larger amount of heat from the fuel cell stack than the first reactor and is more likely to become hot than the first reactor. Since the second amount of heat of the second reactor is limited to a value smaller than the first amount of heat of the first reactor, an increase in temperature of the second reactor is reduced.

In the above aspect, in the limit control, the control device may be configured to make an average value of the second current smaller than an average value of the first current in each ON-OFF cycle of the first switching element and the second switching element.

In the above aspect, in the limit control, the control device may be configured to make a second continuous operation period shorter than a first continuous operation period within the period of the ON-OFF cycles of the first switching element and the second switching element, and reduce the second duty cycle after the second continuous operation period. The first continuous operation period is a period during which the first duty cycle is a predetermined value, and the second continuous operation period is a period during which the second duty cycle is the predetermined value.

In the above aspect, the control device may be configured to obtain a first correlation value that correlates with a temperature of the second reactor. The control device may be configured to execute the limit control when an execution condition is satisfied, execute normal control when the execution condition is not satisfied. In the limit control, the control device may be configured to reduce the second duty cycle to a value smaller than in the normal control. The execution condition is that the first correlation value indicates that the temperature of the second reactor is equal to or higher than a first threshold.

In the above aspect, the control device may be configured to stop the limit control and execute the normal control when a predetermined stop condition is satisfied during the limit control. The stop condition may include a case where the first correlation value indicates that the temperature of the second reactor is lower than a second threshold that is smaller than the first threshold.

In the above aspect, the first correlation value may include at least one of a temperature of the fuel cell stack, a temperature of the cooling water that cools the fuel cell stack, an output current value of the fuel cell stack, the average value of the second current, and a detection value of a temperature sensor provided for the second reactor.

In the above aspect, the control device may be configured toe: control another power converter that converts electric power of a secondary battery and supplies the converted electric power to a load device to which electric power of the fuel cell stack converted by the power converter is supplied; and obtain a charge level of the secondary battery. In the limit control, the control device may be configured to reduce the first duty cycle in a case where the charge level is equal to or higher than a charge level threshold to a value smaller than in a case where the charge level is lower than the charge level threshold, and thus reduce a difference between the first current and the second current in the case where the charge level is equal to or higher than the charge level threshold to a value smaller than in the case where the charge level is lower than the charge level threshold. In the limit control, the control device may be configured to increase the electric power of the secondary battery converted by the other power converter in the case where the charge level is equal to or higher than the charge level threshold to a value larger than in the case where the charge level is lower than the charge level threshold.

In the above aspect, the control device may be configured to obtain a second correlation value that correlates with a temperature of the first reactor. In the limit control, the control device may be configured to increase the first duty cycle in a case where the second correlation value indicates that the temperature of the first reactor is lower than the second threshold to a value larger than in a case where the second correlation value indicates that the temperature of the first reactor is equal to or higher than the second threshold.

In the above aspect, the power converter may include a third reactor connected in parallel with the first and second reactors to the fuel cell stack, and a third switching element connected to the third reactor. The third reactor may be located closer to the cooling water discharge manifold than the first reactor is, and is located farther away from the cooling water discharge manifold than the second reactor is. The control device may be configured to set a third duty cycle of the third switching element. In the limit control, the control device may be configured to control the setting of the first duty cycle, the second duty cycle, and the third duty cycle to control a third amount of heat that is generated by the third reactor due to a third current flowing through the third reactor to a value smaller than the first amount of heat and larger than the second amount of heat within a period of at least a plurality of ON-OFF cycles of the first, second, and third switching elements.

In the above aspect, the fuel cell stack and the power converter may be accommodated in an integral case.

A second aspect of the disclosure relates to a fuel cell system including: the fuel cell stack; the power converter; and the control device for the power converter according to the above aspect.

The disclosure thus provides the control device for the power converter which reduces an increase in temperature of the reactor disposed near the fuel cell stack, and the fuel cell system.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

General Configuration of Fuel Cell System

Figure 1:
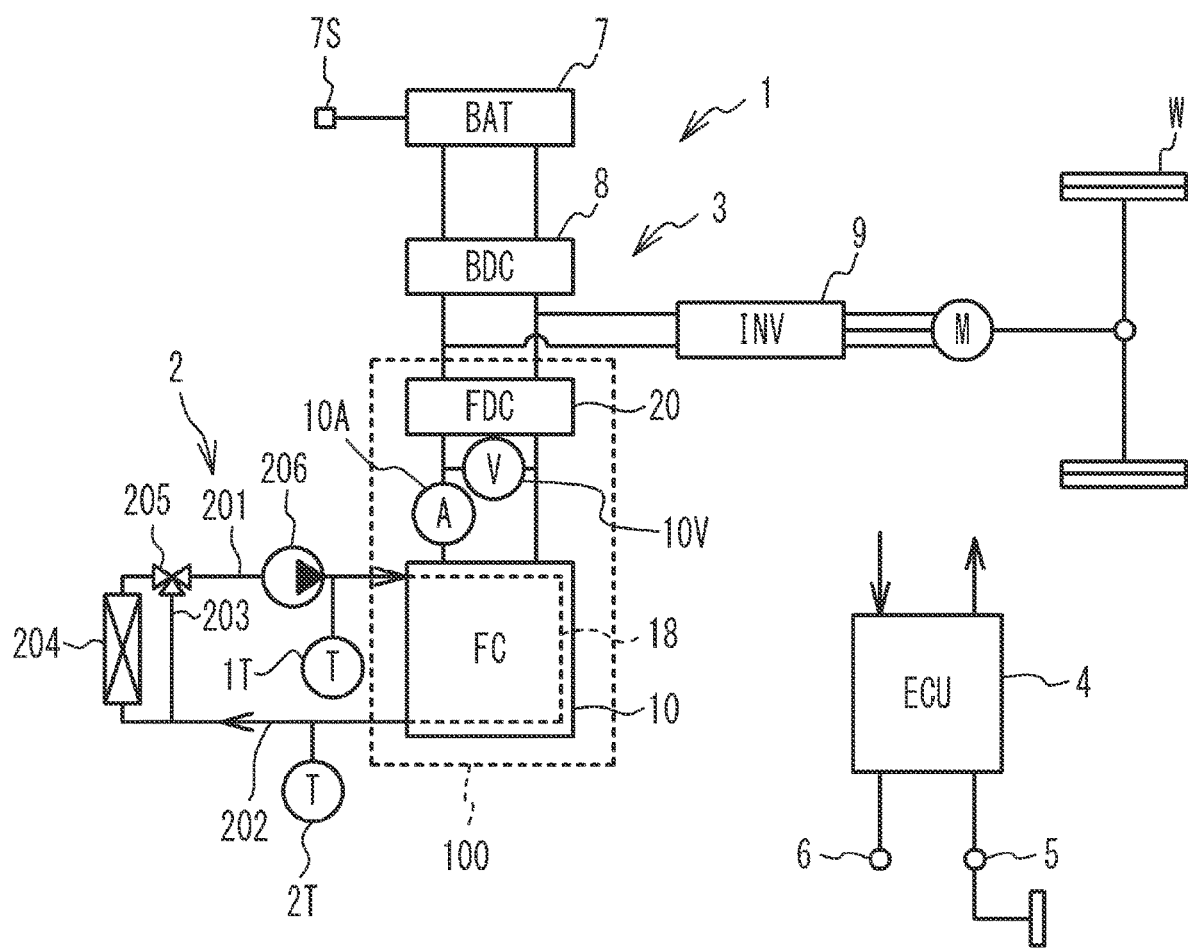
FIG. 1 is a configuration diagram of a fuel cell system mounted on a vehicle.

FIG. 1 is a configuration diagram of a fuel cell system 1 mounted on a vehicle. The fuel cell system 1 includes a cooling system 2, a power control system 3, an electronic control unit (ECU) 4, a secondary battery (hereinafter referred to as BAT) 7, a battery converter (hereinafter referred to as BDC) 8, and an inverter (hereinafter referred to as INV). 9, and a fuel cell unit (hereinafter referred to as FC unit) 100. As will be described in detail later, the FC unit 100 includes a fuel cell stack (hereinafter referred to as FC) 10 and a boost converter (hereinafter referred to as FDC) 20. Although not shown in FIG. 1, the fuel cell system 1 includes an oxidant gas supply system that supplies oxidizing gas to the FC 10, and a fuel gas supply system that supplies fuel gas to the FC 10. The vehicle includes a traction motor M, wheels W, an accelerator operation amount sensor 5, and an ignition switch 6.

The FC 10 is supplied with the fuel gas and the oxidant gas to generate electric power. The FC 10 is a stack of a plurality of polymer electrolyte single cells. The FC 10 has a cathode flow path, an anode flow path, and a cooling water flow path 18. The oxidant gas flows through the cathode flow path, the fuel gas flows through the anode flow path, and cooling water flows through the cooling water flow path 18 as will be describe later in detail later.

The cooling system 2 cools the FC 10 by circulating the cooling water through a predetermined path. The cooling system 2 includes a supply pipe 201, a discharge pipe 202, a bypass pipe 203, a radiator 204, a bypass valve 205, a water pump (hereinafter referred to as WP) 206, and temperature sensors 1T, 2T.

The supply pipe 201 is connected to a cooling water supply manifold of the FC 10 described later. The discharge pipe 202 is connected to a cooling water discharge manifold of the FC 10. The bypass pipe 203 allows the supply pipe 201 and the discharge pipe 202 to communicate with each other. The bypass valve 205 is provided at a connection portion between the supply pipe 201 and the bypass pipe 203. The bypass valve 205 switches the communication state between the supply pipe 201 and the bypass pipe 203. The radiator 204 is connected to the supply pipe 201 and the discharge pipe 202. The bypass valve 205 and the WP 206 are located on the supply pipe 201 in this order from the upstream side. The WP 206 circulates the cooling water, which is a cooling medium, between the FC 10 and the radiator 204 via the supply pipe 201 and the discharge pipe 202. The radiator 204 cools the cooling water discharged from the FC 10 by exchanging heat with outside air. The ECU 4 controls driving of the bypass valve 205 and the WP 206. The temperature sensor 1T is provided on the supply pipe 201. The temperature sensor 1T detects the temperature of the cooling water flowing into the FC 10, and the ECU 4 obtains the detection result. The temperature sensor 2T is provided on the discharge pipe 202. The temperature sensor 2T detects the temperature of the cooling water discharged from the FC 10, and the ECU 4 obtains the detection result.

The FDC 20 is a DC-to-DC converter that boosts a DC voltage output from the FC 10 at a predetermined boost ratio and supplies the output power of the FC 10 to the INV 9. The FDC 20 is an example of the power converter. The INV 9 converts the input DC power to three-phase AC power and supplies the three-phase AC power to the motor M. The motor M drives the wheels W to drive the vehicle. The BDC 8 is a bidirectional DC-to-DC converter. That is, the BDC 8 is also an example of the other power converter that steps down the DC voltage adjusted by the FDC 20 or boosts a DC voltage of the BAT 7 to supply the output power of the BAT 7 to the INV 9. The fuel cell system 1 need not necessarily include the BDC 8. In this case, the INV 9 functions as the other power converter. The BAT 7 can store the electric power of the FC 10.

The ECU 4 includes a central processing unit (CPU), a read only memory (ROM), and a random access memory (RAM). The accelerator operation amount sensor 5, the ignition switch 6, an SOC sensor 7S, a current sensor 10A, a voltage sensor 10V, the FDC 20, and the BDC 8 are electrically connected to the ECU 4. The SOC sensor 7S detects the state of charge (SOC) of the BAT 7 and outputs the detected SOC to the ECU 4. The SOC indicates the level of charge of the BAT 7. The ECU 4 controls the output power of the FC 10 based on the detection value of the accelerator operation amount sensor 5, the SOC, etc. The ECU 4 obtains an output current value of the FC 10 detected by the current sensor 10A and an output voltage value of the FC 10 detected by the voltage sensor 10V. The ECU 4 is an example of the control device that controls the FDC 20. The ECU 4 executes limit control that will be described in detail later. The limit control is implemented by the setting unit, the control unit, and the first obtaining unit which are functionally implemented by the CPU, the ROM, and the RAM of the ECU 4.

General Configuration of FC Unit

Figure 2:
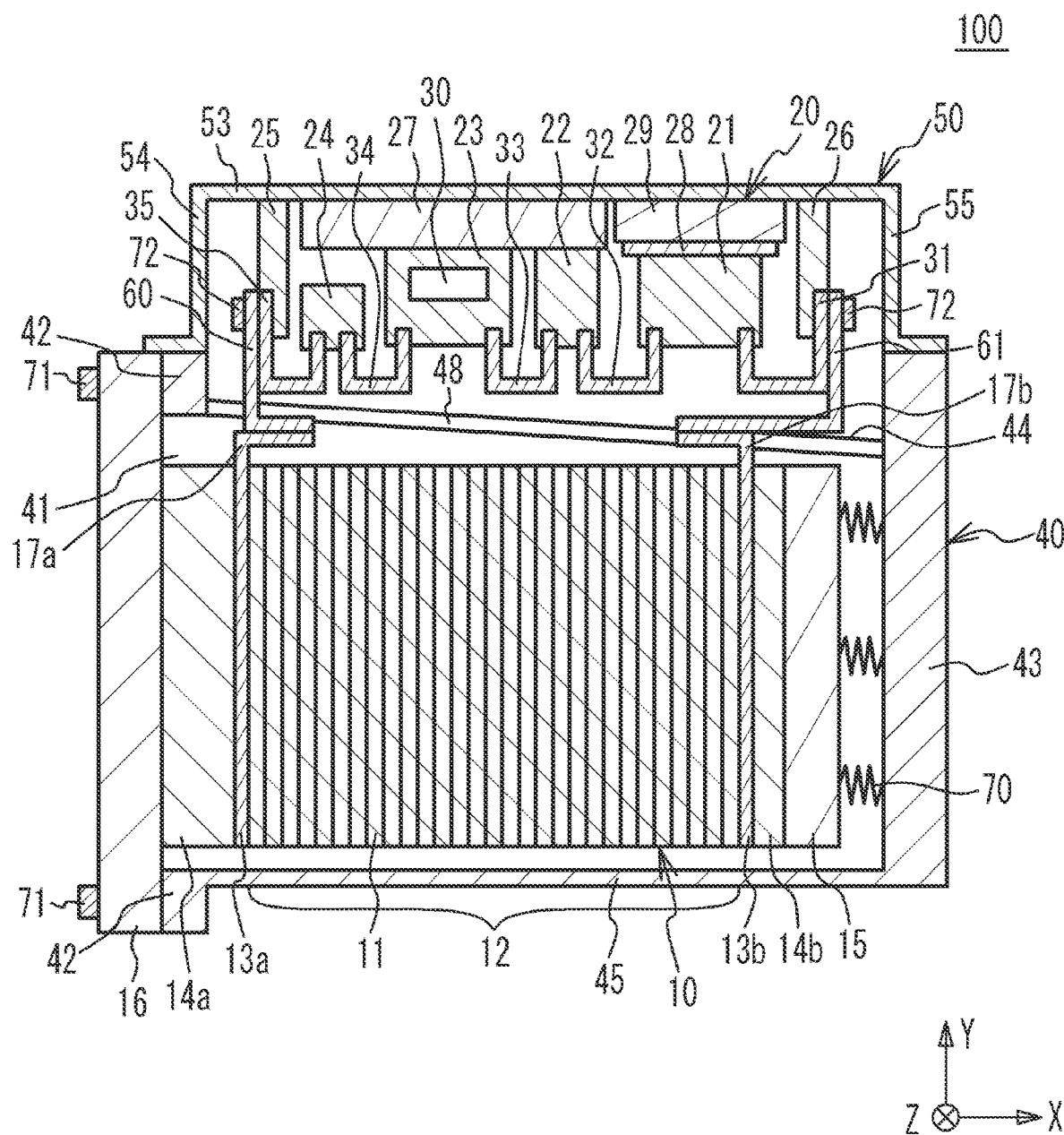
FIG. 2 is a sectional view of a fuel cell unit.
Figure 3:
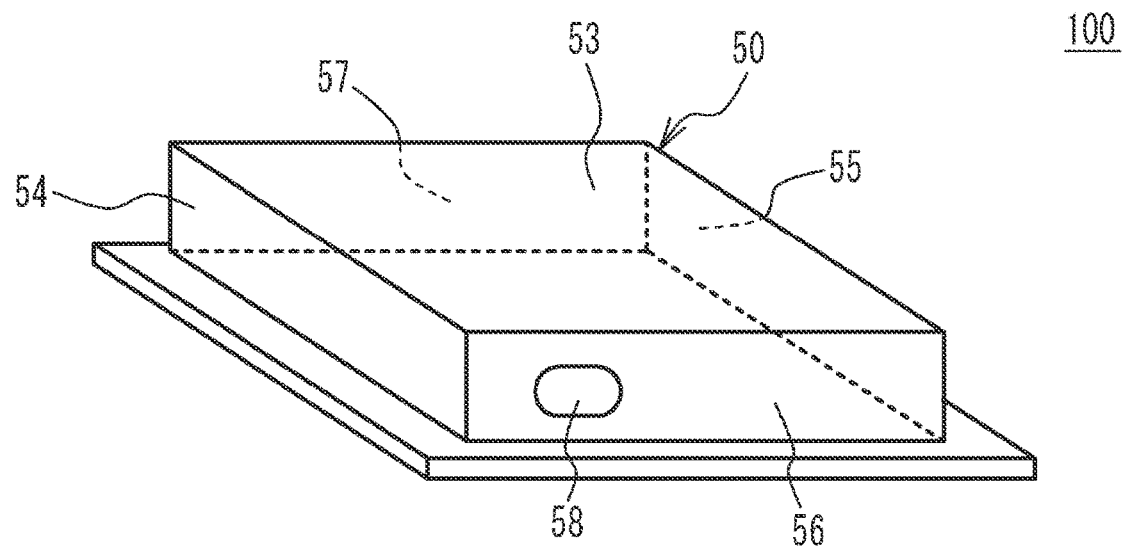
FIG. 3 is a perspective view of the fuel cell unit with a converter case detached from a stack case.
Figure 3:
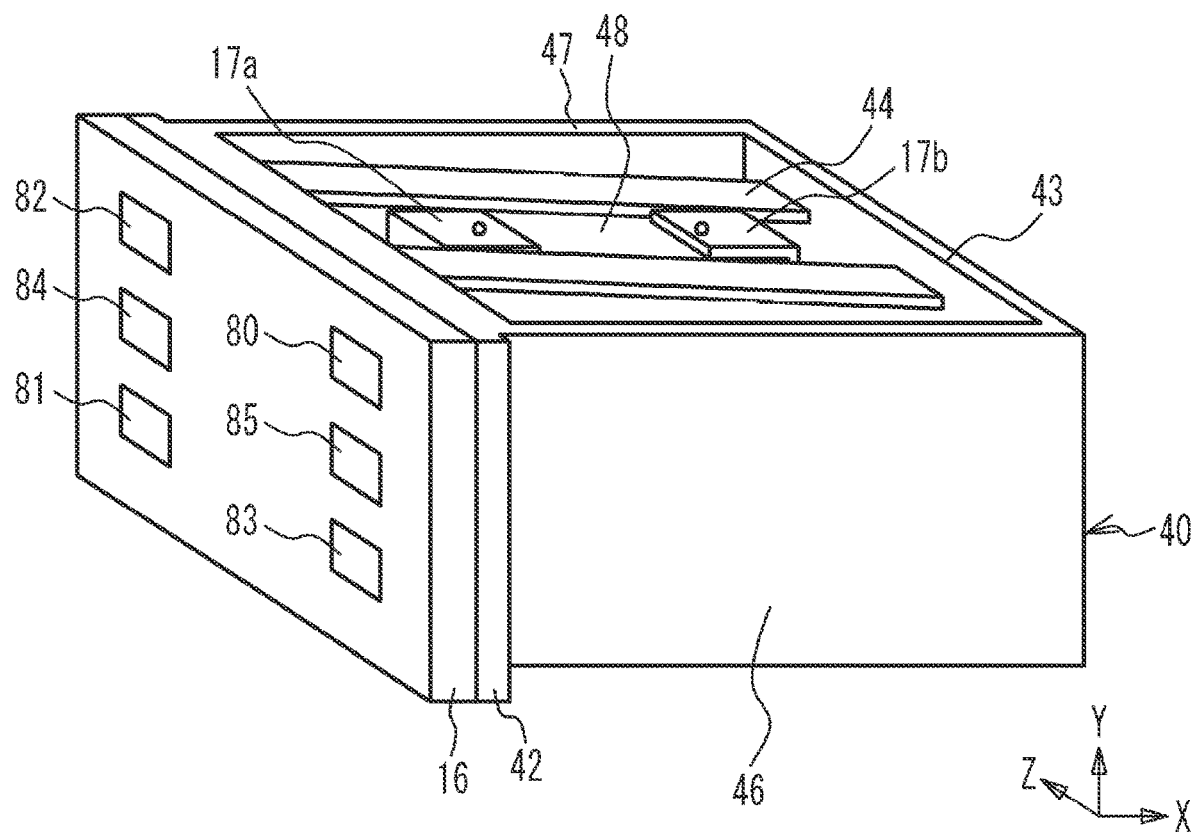

FIG. 2 is a sectional view of the FC unit 100. The FC unit 100 includes the FC 10, the FDC 20, a stack case (hereinafter referred to as FC case) 40, and a converter case (hereinafter referred to as FDC case) 50. The FC 10 is accommodated in the FC case 40. The FDC 20 is accommodated in the FDC case 50. The FC 10 and the FDC 20 are electrically connected to each other in the FC case 40 and the FDC case 50. The FC case 40 and the FDC case 50 are an example of the integral case. FIG. 3 is a perspective view of the FC unit 100 with the FDC case 50 detached from the FC case 40. FIGS. 2 and 3 illustrate X, Y, and Z directions perpendicular to each other. The X direction is a direction in which a plurality of single cells 11 of the FC 10, which will be described later, are stacked. The Y direction is a direction in which the FC 10 and the FDC 20 are arranged next to each other.

Detailed Configuration of FC

The FC 10 includes a cell stack 12 of the single cells 11 stacked in the X direction, terminals 13a, 13b, insulators 14a, 14b, a pressure plate 15, and an end plate 16. The terminals 13a, 13b are disposed at both ends of the cell stack 12 in the X direction and have projecting portions 17a, 17b projecting beyond the cell stack 12 in the +Y direction.

The single cell 11 is a polymer electrolyte fuel cell that is supplied with hydrogen (anode gas) and air (cathode gas), which are reactive gases, to generate electric power. The single cell 11 includes a membrane electrode assembly and a pair of separators sandwiching the membrane electrode assembly therebetween. The membrane electrode assembly is a power generator composed of an electrolyte membrane and electrodes disposed on both sides of the electrolyte membrane. The electrolyte membrane is a solid polymer membrane that is made of a fluororesin material or hydrocarbon resin material having a sulfonate group. The electrolyte membrane exhibits satisfactory proton conductivity when in a wet state. Each of the electrodes include a carbon support and an ionomer that is a solid polymer having a sulfonate group and that exhibits satisfactory proton conductivity when in a wet state. A catalyst for facilitating a power generation reaction (e.g., platinum, a platinum-cobalt alloy, etc.) is supported on the carbon support. Manifolds through which the reactive gases and the cooling water flow are provided for the single cells 11. The reactive gases flowing through the manifolds are supplied to a power generation region of each single cell 11 via a gas flow path formed in each single cell 11. The single cells 11 may be fuel cells other than the polymer electrolyte fuel cells.

The end plate 16 is disposed on the opposite side of the terminal 13a and the insulator 14a from the cell stack 12. In the FC 10, the insulator 14a, the terminal 13a, the cell stack 12, the terminal 13b, the insulator 14b, and the pressure plate 15 are stacked on a main surface of the end plate 16 in this order. The end plate 16 is fixedly fastened to a flange 42 of the FC case 40 with bolts 71. The FC case 10 has an opening 41 inside the flange 42. The FC 10 provided on the end plate 16 is accommodated in the FC case 40 by fixing the end plate 16 to the flange 42 of the FC case 40.

The terminals 13a, 13b are made of a conductive material such as metal or dense carbon and are provided to output electric power generated by the single cells 11. The insulators 14a, 14b are made of an insulating material such as rubber or resin and are provided to insulate the terminals 13a, 13b from the end plate 16 and the pressure plate 15 which are located outside the insulators 14a, 14b, respectively. The pressure plate 15 is made of a highly rigid metal material such as stainless steel or aluminum alloy and is provided to apply a compressive load to the cell stack 12 by springs 70 described later. The end plate 16 is made of a highly rigid metal material such as stainless steel or aluminum alloy.

The FC 10 has an anode supply manifold 80, an anode discharge manifold 81, a cathode supply manifold 82, a cathode discharge manifold 83, a cooling water supply manifold 84, and a cooling water discharge manifold 85. These manifolds 80 to 85 are through holes extending through the end plate 16, the insulator 14a, the terminal 13a, and the cell stack 12 in the X direction. The anode gas supplied to the anode supply manifold 80 flows through each single cell 11 and is discharged to the anode discharge manifold 81. The cathode gas supplied to the cathode supply manifold 82 flows through each single cell 11 and is discharged to the cathode discharge manifold 83. The anode gas and the cathode gas are thus supplied to the membrane electrode assembly of each single cell 11. The cooling water supply manifold 84 and the cooling water discharge manifold 85 will be described later in detail.

Detailed Configuration of FC Case

The FC case 40 has the frame-shaped flange 42 on its one side in the X direction and has the opening 41 inside the flange 42. The FC case 40 has a bottom wall 43 on the other side in the X direction, namely on the opposite side of the FC 10 from the end plate 16. The FC case 40 has a plurality of side walls 44 to 47 that connect the flange 42 and the bottom wall 43. The FC case 40 is made of a highly rigid metal material such as aluminum alloy. The springs 70 are disposed in a compressed state between the bottom wall 43 of the FC case 40 and the pressure plate 15, and a compressive load is applied to the cell stack 12 in the stacking direction by the reaction force of the springs 70.

Of the side walls 44 to 47 of the FC case 40, the side wall 44 is located between the FC 10 and the FDC 20. Bus bars 60, 61 are connected to the terminals 13a, 13b, respectively, in an opening 48 formed in the side wall 44. The bus bars 60, 61 are not shown in FIG. 3. The side wall 45 is located on the opposite side of the FC 10 from the side wall 44. The side walls 46, 47 intersect with the side walls 44, 45 and are connected to the flange 42, the bottom wall 43, and the side wall 45.

Detailed Configuration of FDC

The FDC 20 boosts the output voltage of the FC10. The FDC 20 includes a reactor 21, a current sensor 22, an intelligent power module (IPM) 23, a capacitor 24, terminal blocks 25, 26, and conductive members (e.g., bus bars or cables) 31 to 35. A circuit board 27 that controls the IPM 23 and detects a signal of the current sensor 22 is provided over the current sensor 22, the IPM 23, and the capacitor 24. The outer peripheral surface of a coil of the reactor 21 is in contact with a cooling tank 29 via a heat dissipation sheet 28. A cooling medium for keeping the cooling tank 29 within a predetermined temperature range is circulated in the cooling tank 29. The reactor 21 is cooled in this manner. The IPM 23 has a cooling medium passage 30 through which the cooling medium flows. The IPM 23 is cooled in this manner.

The reactor 21 and the current sensor 22 are electrically connected by the conductive member 32. The current sensor 22 and the IPM 23 are electrically connected by the conductive member 33. The IPM 23 and the capacitor 24 are electrically connected by the conductive member 34. The conductive member 31 electrically connected to the reactor 21 is fixed to the terminal block 26, and the conductive member 35 electrically connected to the capacitor 24 is fixed to the terminal block 25. The conductive members 31 to 35 contain a metal with low electrical resistivity such as copper, aluminum, or alloy containing these. The terminal blocks 25, 26 have a synthetic resin holder portion for holding the conductive member. If the holder portion becomes too hot, it may become less strong, resulting in problems such as deformation. It is therefore preferable that these conductive members be kept at a predetermined temperature or lower (e.g., 130° C. or lower).

One end of the bus bar 60 is fixed to the projecting portion 17a of the terminal 13a of the FC 10 by bolts. The bus bar 60 is thus electrically connected to the terminal 13a of the FC 10. The other end of the bus bar 60 is fixed to the conductive member 35 by bolts 72 on the terminal block 25. The bus bar 60 is thus electrically connected to the conductive member 35. One end of the bus bar 61 is fixed to the projecting portion 17b of the terminal 13b of the FC 10 by bolts. The bus bar 61 is thus electrically connected to the terminal 13b of the FC 10. The other end of the bus bar 61 is fixed to the conductive member 31 by bolts 72 on the terminal block 26. The bus bar 61 is thus electrically connected to the conductive member 31. The bus bars 60, 61 are made of a metal with low electrical resistivity such as copper, aluminum, or alloy containing these and are disposed in the FC case 40 and the FDC case 50. The FC 10 and the FDC 20 are electrically connected by the bus bars 60, 61.

Detailed Configuration of FDC Case

The FDC 20 is accommodated in the FDC case 50. The FDC case 50 is made of a highly rigid material like a metal material such as aluminum alloy. The FDC case 50 has a bottom wall 53 and side walls 54 to 57. The FDC case 50 is open on the opposite side from the bottom wall 53 so that the bus bars 60, 61 can pass therethrough. The FDC case 50 has a flange that is continuous with the side walls 54 to 57. The flange of the FDC case 50 is fixedly fastened to the flange 42, the bottom wall 43, and the side walls 46, 47 of the FC case 40 by bolts. The FC 10 and the FDC 20 are accommodated in a housing formed by fastening the FC case 40, the FDC case 50, and the end plate 16 and are thus isolated from the outside. The side wall 56 of the FDC case 50 has an opening 58, and an output connector, not shown, of the FDC 20 is exposed from the opening 58. The output connector and the INV 9 are connected by a cable, so that electric power boosted by the FDC 20 is supplied to the INV 9.

Circuit Configuration of FDC

Figure 4:
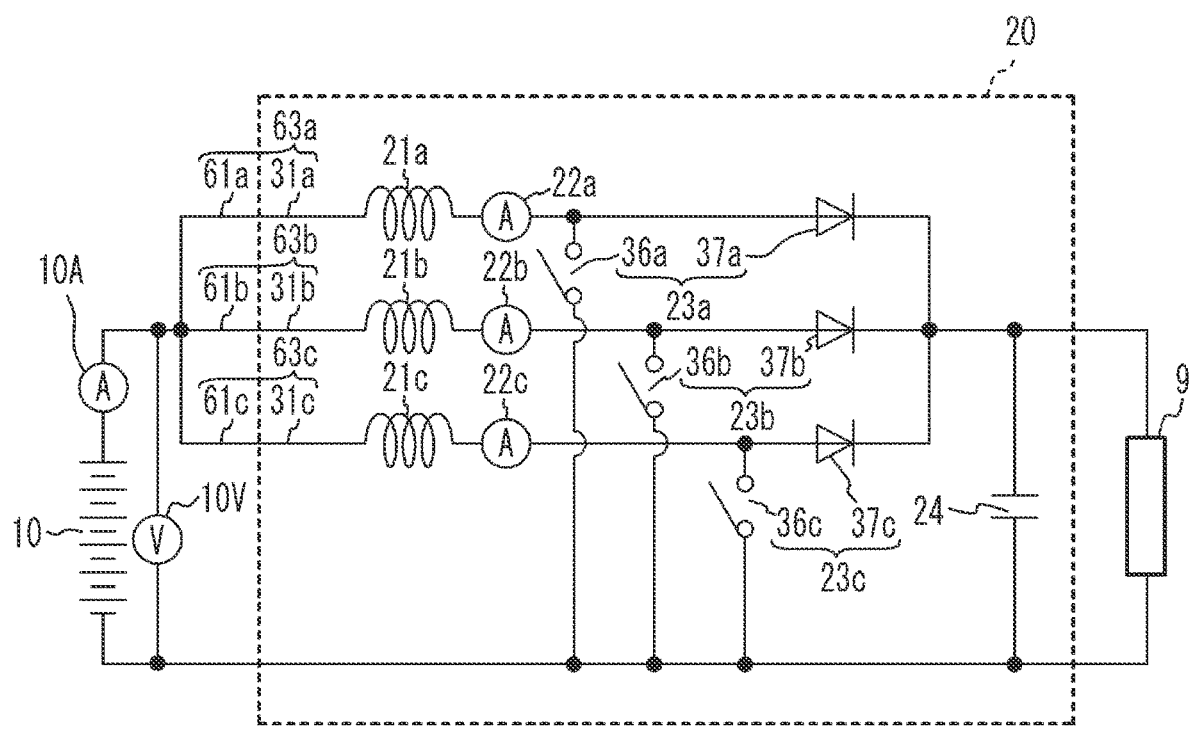
FIG. 4 illustrates a circuit configuration of a boost converter.

FIG. 4 illustrates a circuit configuration of the FDC 20. FIG. 4 also illustrates the FC10 and the INV 9. As shown in FIG. 4, the FDC 20 includes reactors 21a to 21c, current sensors 22a to 22c, IPMs 23a to 23c, and the capacitor 24. The IPM 23a includes a switching element 36a and a diode 37a. The IPM 23b includes a switching element 36b and a diode 37b. The IPM 23c includes a switching element 36c and a diode 37c. The reactors 21a to 21c are the same as the reactor 21 shown in FIG. 2, but are denoted with different reference signs for convenience of description. The same applies to the IPMs 23a to 23c.

The reactor 21a, the current sensor 22a, and the diode 37a are connected in series. Similarly, the reactor 21b, the current sensor 22b, and the diode 37b are also connected in series. The reactor 21c, the current sensor 22c, and the diode 37c are also connected in series. These three sets of components connected in series are connected in parallel between a positive electrode of the FC 10 and a positive electrode of the INV 9. This configuration reduces the currents flowing through each of the reactors 21a to 21c and the IPMs 23a to 23c and thus reduces heat generation. The switching element 36a is connected between a point between the reactor 21a and the diode 37a and a negative electrode of the FC 10. Similarly, the switching element 36b is connected between a point between the reactor 21b and the diode 37b and the negative electrode of the FC 10. The switching element 36c is connected between a point between the reactor 21c and the diode 37c and the negative electrode of the FC 10. The reactors 21a to 21c are, e.g., the same components with the same configuration and performance. However, the disclosure is not limited to this.

The FC 10 and the reactor 21a are electrically connected by a bus bar 63a including a fuel cell-side bus bar 61a and a converter-side bus bar 31a. Similarly, the FC 10 and the reactor 21b are electrically connected by a bus bar 63b including a fuel cell-side bus bar 61b and a converter-side bus bar 31b. The FC 10 and the reactor 21c are electrically connected by a bus bar 63c including a fuel cell-side bus bar 61c and a converter-side bus bar 31c. The fuel cell-side bus bars 61a to 61c are the same as the fuel cell-side bus bar 61 shown in FIG. 2, but are denoted with different reference signs for convenience of description. The same applies to the converter-side bus bars 31a to 31c.

The current sensors 22a to 22c are connected to the downstream sides of the reactors 21a to 21c. However, the disclosure is not limited to this, and the current sensors 22a to 22c may be connected to the upstream sides of the reactors 21a to 21c. The ECU 4 switches on and off each of the switching elements 36a to 36c in, e.g., the same fixed cycle. The currents flowing through the switching elements 36a to 36c are controlled by switching on and off the switching elements 36a to 36c. Switching of the switching elements 36a to 36c is controlled based on the duty cycles of pulse signals that are supplied to the switching elements 36a to 36c. The duty cycle is the ratio of ON time to the total ON-OFF cycle time. The ECU 4 determines the duty cycles based on current values detected by the current sensors 22a to 22c and a target boost ratio.

When the switching element 36a is switched on, a current starts to flow from the FC 10 to the switching element 36a through the reactor 21a, and magnetic energy generated by DC excitation is stored in the reactor 21a. When the switching element 36a is switched off, the magnetic energy stored in the reactor 21a during the ON period is output as a current to the INV 9 through the diode 37a. By controlling the duty cycles for the switching elements 36a to 36c, the energy (time average) that is stored in each of the reactors 21a to 21c can be controlled, and currents that flows through the reactors 21a to 21c on average (effective currents) can be controlled.

The switching elements 36a to 36c are switched on and off with a phase difference of 120 degrees from each other. Specifically, the switching element 36a is switched on, then off, and back on again. A cycle T1 from the time the switching element 36a is switched on to the time the switching element 36a is switched on again corresponds to the cycle of switching control for the switching element 36a. The switching element 36b is switched on after the switching element 36a is switched on, and is then switched off and back on again. The period from the time the switching element 36a is switched on to the time the switching element 36b is subsequently switched on corresponds to ⅓ of the cycle T1. Similarly, the switching element 36c is switched on after the switching element 36b is switched on, and is then switched off and back on again. The period from the time the switching element 36a is switched on to the time the switching element 36c is subsequently switched on corresponds to ⅔ of the cycle T1. Although FIGS. 6A and 6B, which will be described later, illustrate an example in which the duty cycles are ⅓, the duty cycles may be set as desired based on the target boost ratio etc. The switching elements 36a to 36c are repeatedly switched on and off in this manner.

An induced voltage generated by the magnetic energy stored in the reactor 21a when the switching element 36a is switched off is superimposed on the output voltage of the FC 10, so that a voltage higher than the output voltage of the FC 10 is applied to the INV 9. The same applies to the switching elements 36b, 36c and the reactors 21b, 21c. The ECU 4 sends control signals so that the switching elements 36a to 36c are sequentially switched on, and induced voltages are sequentially superimposed on the output voltage of the FC 10. The voltage that is applied to the INV 9 is thus kept higher than the output voltage of the FC 10. The capacitor 24 is connected between a point between the diodes 37a to 37c and the positive electrode of the INV 9 and a negative electrode of the INV 9 and serves to reduce voltage fluctuations.

Heat Reactor Receives from FC

Figure 5:
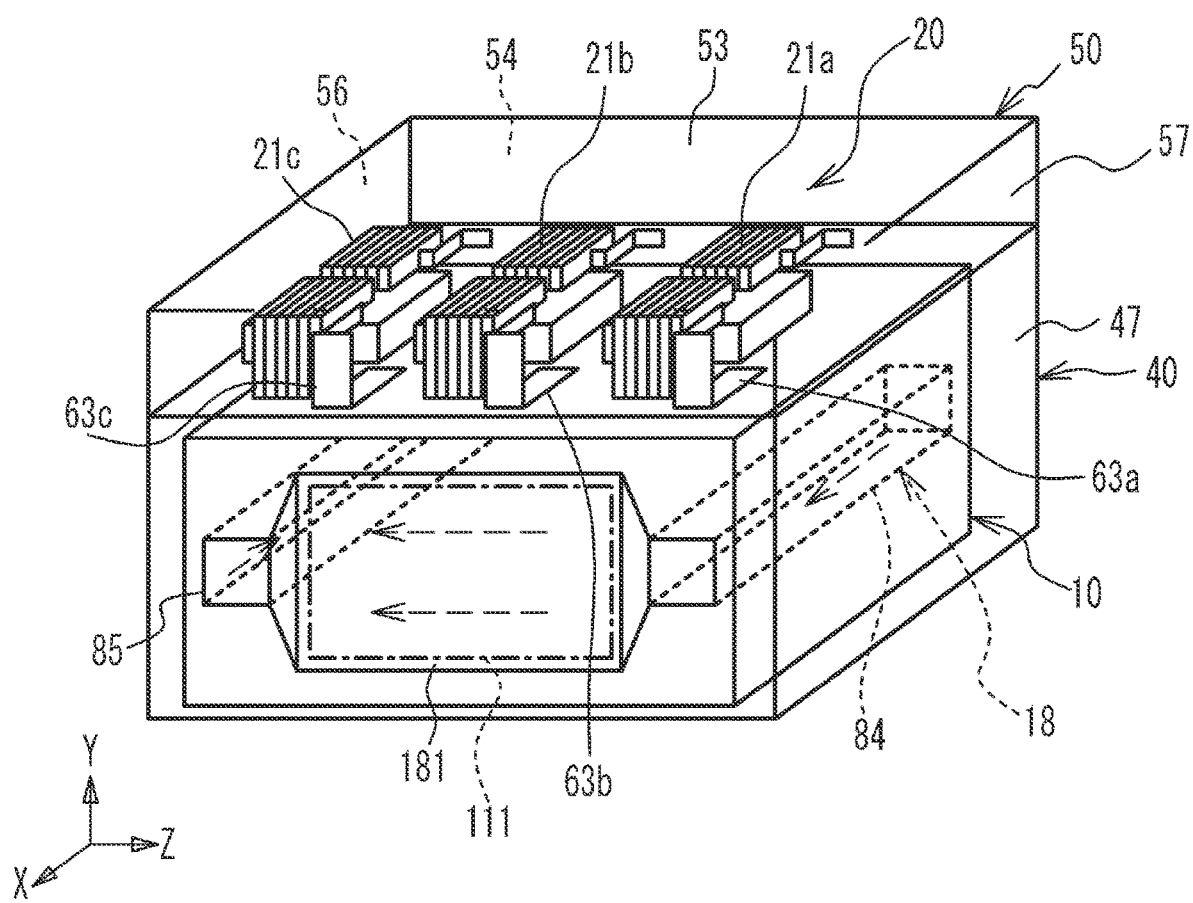
FIG. 5 schematically illustrates the positional relationship between a fuel cell stack and reactors.

FIG. 5 schematically illustrates the positional relationship between the FC 10 and the reactors 21a to 21c. The cooling water flow path 18 formed in the FC 10 includes the cooling water supply manifold 84, the cooling water discharge manifold 85, and an inter-cell flow path 181. The inter-cell flow path 181 is formed between adjacent ones of the single cells 11. The inter-cell flow path 181 has a predetermined width in the Y direction and extends in the YZ plane in the Z direction. The cooling water thus flows from the supply pipe 201 into the cooling water supply manifold 84 in the +X direction, flows through the inter-cell flow path 181 in the −Z direction, flows through the cooling water discharge manifold 85 in the −X direction, and is discharged into the discharge pipe 202.

In FIG. 5, a membrane electrode assembly 111 of the single cell 11 overlaps the inter-cell flow path 181 in the X direction is shown by a long dashed short dashed line. As the cooling water flows in the inter-cell flow path 181, the membrane electrode assembly 111 that generates heat by the power generation reaction is effectively cooled. While flowing in the inter-cell flow path 181, the cooling water receives heat from the membrane electrode assembly 111 and the temperature of the cooling water thus increases. The temperature of the cooling water is therefore higher on the downstream side (the cooling water discharge manifold 85 side) in the inter-cell flow path 181 than on the upstream side (the cooling water supply manifold 84 side) in the inter-cell flow path 181. Accordingly, the temperature of the cooling water having entered the cooling water discharge manifold 85 from the inter-cell flow path 181 is higher than the temperature of the cooling water flowing in the cooling water supply manifold 84 and the temperature of the cooling water flowing in the inter-cell flow path 181. The temperature of the FC 10 is therefore higher as it gets closer to the cooling water discharge manifold 85.

The reactors 21a to 21c are disposed in this order in the −Z direction. The reactor 21c is located closest to the cooling water discharge manifold 85, and the reactor 21a is located farthest from the cooling water discharge manifold 85. Accordingly, the reactor 21c receives the largest amount of heat from the FC 10 and is most likely to become hot, and the reactor 21a receives the smallest amount of heat from the FC 10 and is least likely to become hot. The reactor 21a is an example of the first reactor, the reactor 21c is an example of the second reactor, and the reactor 21b is an example of the third reactor.

Amount of Heat of Reactors

The reactors 21a to 21c not only receive heat from the FC 10 but also generate heat due to currents flowing through the reactors 21a to 21c. The ECU 4 therefore executes normal control as will be described later. In the normal control, the ECU 4 controls the duty cycles of the switching elements 36a to 36c so that currents having the same value flow through the reactors 21a to 21c, more specifically, so that the average values of currents Ia to Ic flowing through the reactors 21a to 21c become the same. The switching element 36a is an example of the first switching element, the switching element 36c is an example of the second switching element, and the switching element 36b is an example of the third switching element. The current Ia is an example of the first current, the current Ic is an example of the second current, and the current Ib is an example of the third current.

In the specification, "the amount of heat of the reactor" or "the amount of heat of the reactor itself" does not include the amount of heat the reactor receives from the FC 10, and means the amount of heat generated by the reactor due to a current flowing therethrough. As described below, the currents flowing through the reactors repeatedly increase and decrease in a predetermined cycle. However, the amount of heat of the reactor does not mean the amount of heat generated during a short period of time such as during only a period in which the current increases or a period in which the current decreases, but means the amount of heat generated within a period of a plurality of cycles.

Normal Control

Figure 6A:
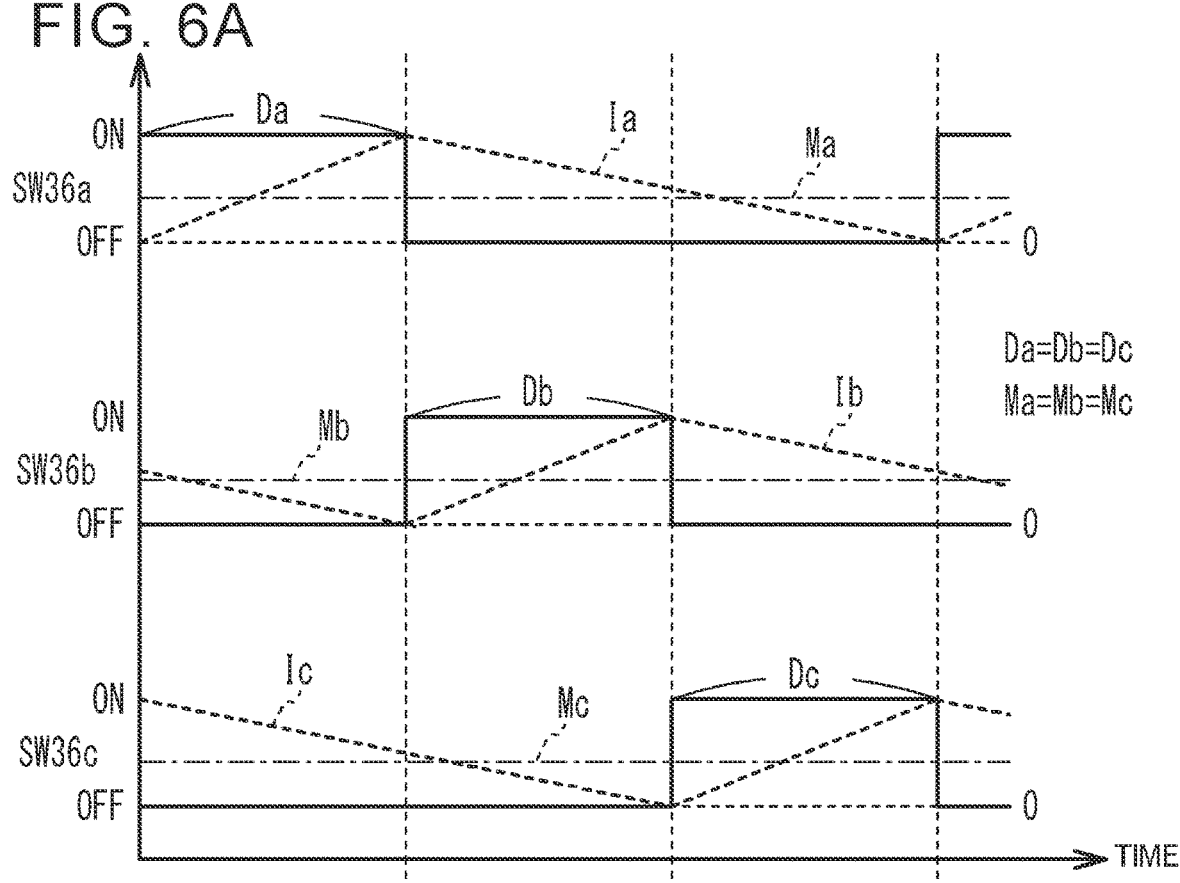
FIG. 6A is a timing chart illustrating the ON-OFF states of switching elements, the currents flowing through the reactors, and the average values of the currents during normal control.

FIG. 6A is a timing chart illustrating the ON-OFF states of the switching elements 36a to 36c, the currents Ia to Ic flowing through the reactors 21a to 21c, and the average values of the currents Ia to Ic during the normal control. In FIG. 6A, SW36a to SW36c indicate the switching elements 36a to 36c. A combined current of the currents Ia to Ic is supplied to the INV 9, and ripples in this current are reduced by the capacitor 24. The current Ia gradually increases when the switching element 36a is switched on, and gradually decreases when the switching element 36a is switched off. The ECU 4 determines the duty cycle of the switching element 36a by referring to the value of the current Ia detected by the current sensor 22a so that the average value of the current Ia becomes equal to a desired value. The ECU 4 determines the duty cycles of the switching elements 36b, 36c in a similar manner. In the normal control, the duty cycles of the switching elements 36a to 36c are set so to ratios Da to Dc (%) so that the average value Ma (A) of the current Ia, the average value Mb (A) of the current Ib, and the average value Mc (A) of the current Ic become equal to each other. Ripples in the combined current of the currents Ia to Ic are reduced by making the average values Ma to Mc equal to each other. Although the ratios Da to Dc are herein described as having the same value for convenience of description, the ratios Da to Dc need not necessarily have the same value. For example, due to the difference in length etc. of the bus bars 63a to 63c connected to the reactors 21a to 21c, respectively, the average values of the currents Ia to Ic may not be equal to each other even if the ratios Da to Dc have the same value. In this case, the ratios Da to Dc are set to different values so that the average values become equal to each other. The average value of the current is calculated by dividing the current value integrated over time corresponding to one ON-OFF cycle of the switching element by the time corresponding to the one ON-OFF cycle.

In the normal control, the average values Ma to Mc are controlled so as to become equal to each other. The amounts of heat generated by the reactors 21a to 21c themselves due to the currents Ia to Ic flowing therethrough are substantially the same. As described above, in view of the influence of the heat from the FC 10, the reactor 21c is most likely to become hot. The reactor 21c is therefore most likely to become hot due to the heat from the FC 10 and the amount of heat of the reactor 21c itself.

In the present embodiment, the ECU 4 executes the limit control when a predetermined execution condition is satisfied. In the limit control, the ECU 4 sets the duty cycles of the switching elements 36a to 36c to a predetermined value to limit the amount of heat that is generated by the reactor 21b due to the current Ib flowing therethrough to a value smaller than the amount of heat that is generated by the reactor 21a due to the current Ia flowing therethrough and limit the amount of heat that is generated by the reactor 21c due to the current Ic flowing therethrough to a value smaller than the amount of heat that is generated by the reactor 21b due to the current Ib flowing therethrough.

Limit Control

Figure 6B:
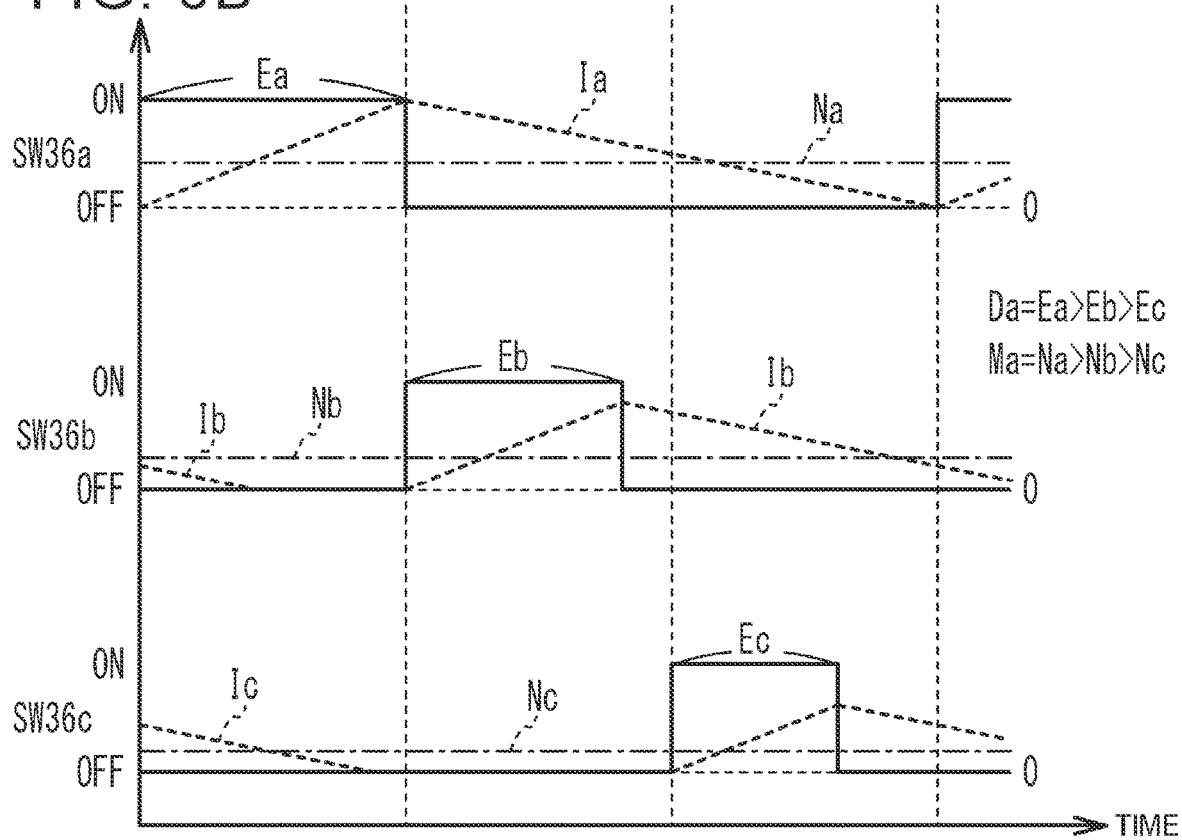
FIG. 6B is a timing chart illustrating the ON-OFF states of the switching elements, the currents flowing through the reactors, and the average values of the currents during limit control.

FIG. 6B is a timing chart illustrating the ON-OFF states of the switching elements 36a to 36c, the currents Ia to Ic flowing through the reactors 21a to 21c, and the average values of the currents Ia to Ic during the limit control. In the limit control, the duty cycles of the switching elements 36a to 36c are set so to ratios Ea to Ec (%) so that the average value Nb (A) of the current Ib becomes smaller than the average value Na (A) of the current Ia and the average value Nc (A) of the current Ic become smaller than the average value Nb. Specifically, the ratio Eb is set to a smaller value than the ratio Ea, and the ratio Ec is set to a smaller value than the ratio Eb. Although the ratio Ea has the same value as the ratio Da and the average value Na (A) of the current Ia in the limit control is the same value as the average value Ma in the normal control, different reference signs are used to indicate these ratios and these average values for convenience of description. As the duty cycles are set in this manner, the amount of heat of the reactor 21b itself becomes smaller than the amount of heat of the reactor 21a itself, and the amount of heat of the reactor 21c itself becomes smaller than the amount of heat of the reactor 21b itself. This configuration reduces an increase in temperature of the reactor 21c that tends to become hot due to the heat from the FC 10, and also reduces an increase in temperature of other components disposed near the reactor 21c. The same applies to the reactor 21b.

The reactors 21a to 21c may be configured to have different specifications from each other so that the amount of heat of the reactor 21b itself becomes smaller than the amount of heat of the reactor 21a itself and the amount of heat of the reactor 21c itself becomes smaller than the amount of heat of the reactor 21b itself during the normal control in which the average values Ma to Mc of the currents Ia to Ic are equal to each other. However, the use of the reactors 21a to 21c having different specifications may increase manufacturing cost. In the present embodiment, an increase in temperature of the reactor 21c that tends to become hot can be easily reduced by controlling the duty cycles of the switching elements 36a to 36c.

In the limit control of the present embodiment, the average value Nb is controlled to be smaller than the average value Na, and the average value Nc is controlled to be smaller than the average value Nb so as to correspond to the temperature gradient of the FC 10. The temperatures of the reactors 21a to 21c and the components disposed near the reactors 21a to 21c are thus made uniform, and only a part of the components are avoided from becoming too hot.

Control that is Executed by ECU 4

Figure 7:
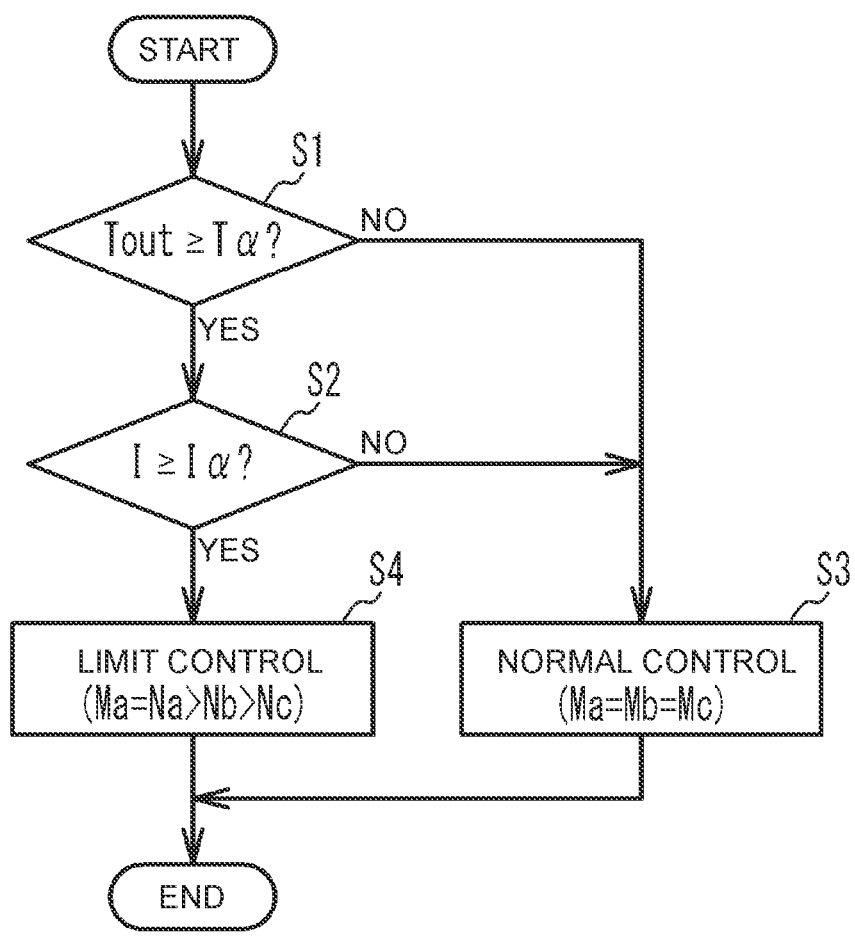
FIG. 7 is a flowchart illustrating an example of control that is executed by an ECU.

Control that is executed by the ECU 4 will be described. FIG. 7 is a flowchart illustrating an example of the control that is executed by the ECU 4. This control is repeatedly executed. First, the ECU 4 obtains a detected temperature Tout from the temperature sensor 2T that detects the temperature of the cooling water discharged from the FC 10, and determines whether the detected temperature Tout is equal to or higher than a threshold T$\alpha$ (step S1). The detected temperature Tout is an example of the first correlation value that correlates with the temperature of the reactor 21c. The higher the detected temperature Tout is, the larger the amount of heat the cooling water receives from the FC 10 while flowing through the cooling water flow path 18 is. Namely, the higher the detected temperature Tout is, the higher the temperature of the FC 10 is, and therefore the hotter the reactor 21c that receives heat from the FC 10 becomes. Step S1 is an example of the process that is executed by the first obtaining unit. The detected temperature Tout being equal to or higher than the threshold Tc is an example of the case where the first correlation value indicates that the temperature of the reactor 21c is equal to or higher than the first threshold.

When Yes in step S1, the ECU 4 obtains a detected current value I from the current sensor 10A that detects an output current value of the FC 10, and determines whether the detected current value I is equal to or larger than a threshold I$\alpha$. (step S2). The detected current value I is also an example of the first correlation value. The larger the detected current value I, which is the output current value of the FC 10, is, the larger the current Ic flowing through the reactor 21c is, and therefore the larger the amount of heat of the reactor 21c itself becomes. Step S2 is an example of the process that is executed by the first obtaining unit of the ECU 4. The detected current value I being equal to or larger than the threshold I$\alpha$ is an example of the case where the first correlation value indicates that the temperature of the reactor 21c is equal to or higher than the first threshold. The larger the detected current value I is, the larger the amount of heat of the reactor 21a itself and the amount of heat of the reactor 21b itself are. Step S2 is also an example of the process that is executed by the first obtaining unit.

When No in step S1 or S2, the ECU 4 determines that there is no possibility that the reactor 21c becomes hot, and executes the normal control (step S3). When Yes in steps S1 and S2, the ECU 4 determines that the reactor 21c may become hot, and executes the limit control (step S4). Accordingly, the detected temperature Tout being equal to or higher than the threshold Tc and the detected current value I being equal to or higher than the threshold Iα are an example of the execution condition for executing the limit control. When No in step S1 or S2 during the limit control, the ECU 4 stops the limit control and executes the normal control. Steps S3 and S4 are an example of the process that is executed by the control unit.

Through steps S3 and S4, the ECU 4 thus determines in view of not only the heat the reactor 21c receives from the FC 10 but also the heat generated by the reactor 21c itself whether the temperature of the reactor 21c is high enough that the ECU 4 needs to execute the limit control. The ECU 4 can therefore accurately determine whether it needs to execute the limit control. The order of steps S1 and S2 may be reversed.

In the present embodiment, the ratios Da to Dc have the same value. However, the ratios Da to Dc may have different values. For example, even for the normal control, the ratios Da to Dc may be set so that the ratio Da has the largest value, followed by the ratios Db and Dc in this order. In this case as well, the ratios Ea to Ec may be set as desired as long as the ratio Ec is the smallest among the ratios Ea to Ec and is smaller than the ratio Dc.

The ratio Ec may be 0%. In this case, in the limit control, the current Ic is always zero, and the amount of heat of the reactor 21c itself can be reduced to zero.

In step S1, the ECU 4 uses the detected temperature Tout of the cooling water discharged from the FC 10. However, the disclosure is not limited to this. For example, the ECU 4 may determine whether the difference between a detected temperature Tin from the temperature sensor 1T provided on the supply pipe 201 and the detected temperature Tout from the temperature sensor 2T is equal to or larger than a threshold. The higher the temperature of the FC 10 is, the larger the difference becomes. Accordingly, in this case, this difference is an example of the first correlation value, and the difference being equal to or larger than the predetermined threshold is an example of the case where the first correlation value indicates that the temperature of the reactor 21c is equal to or higher than the first threshold.

In step S1, the ECU 4 may use, e.g., a detected temperature from a temperature sensor that directly detects the temperature of the FC 10. For example, this temperature sensor may be a contact or non-contact temperature sensor that contacts or does not contact an outer side surface of the cell stack 12 of the FC 10 which is composed of the single cells 11. This temperature sensor may detect the temperature of an outer side surface of the FC 10 which is located near the cooling water discharge manifold 85 that tends to become hot. In this case as well, the detected temperature from the temperature sensor is an example of the first correlation value, and the detected temperature being equal to or higher than a predetermined threshold is an example of the case where the first correlation value indicates that the temperature of the reactor 21c is equal to or higher than the first threshold.

In step S2, the ECU 4 may use the output power value of the FC 10 instead of the detected current value I. The output power value of the FC 10 can be calculated by multiplying the detected current value I from the current sensor 10A by a detected voltage value V from the voltage sensor 10V that detects the voltage of the FC 10. According to the current-voltage characteristics of the FC 10, the larger the output power value of the FC 10 is, the larger the output current value of the FC 10 is. The larger the output current value of the FC 10 is, the larger the current value of the current Ic is. In this case, the output power value of the FC 10 is an example of the first correlation value, and the output power value being equal to or larger than a threshold is an example of the case where the first correlation value indicates that the temperature of the reactor 21c is equal to or higher than the first threshold.

In step S2, the ECU 4 may use the average value of the current Ic flowing through the reactor 21c. The larger the output current value of the ECU 10 is, the larger the average value of the current Ic becomes. The average value of the current Ic is an example of the first correlation value, and the average value being equal to or larger than a threshold is an example of the case where the first correlation value indicates that the temperature of the reactor 21c is equal to or higher than the first threshold.

The ECU 4 may perform only one of steps S1 and S2. In this case, the ECU 4 may execute the normal control when No in step S1 or S2, and may execute the limit control when Yes in step S1 or S2. For example, when the detected temperature Tout from the temperature sensor 2T is high, it is considered that the membrane electrode assemblies generate a large amount of heat and the output current value of the FC 10 is large. The ECU 4 therefore may not perform step S2, namely may perform only step S1. When the output current value of the FC 10 is large, it is considered that the FC 10 generates a large amount of heat and the detected temperature Tout from the temperature sensor 2T is also high. The ECU 4 therefore may not perform step S1, namely may perform only step S2.

The ECU 4 may not switch between the normal control and the limit control and may always perform control so that the average value of the current Ib becomes smaller than the average value of the current Ia and the average value of the current Ic becomes smaller than the average value of the current Ib. For example, even when the operating temperature of the FC 10 is relatively high and the output power of the FC 10 is relatively small during power generation of the FC 10, the ECU 4 performs such control when the temperature of the reactor 21c is always high due to the heat from the FC 10.

First Modification

Figure 8:
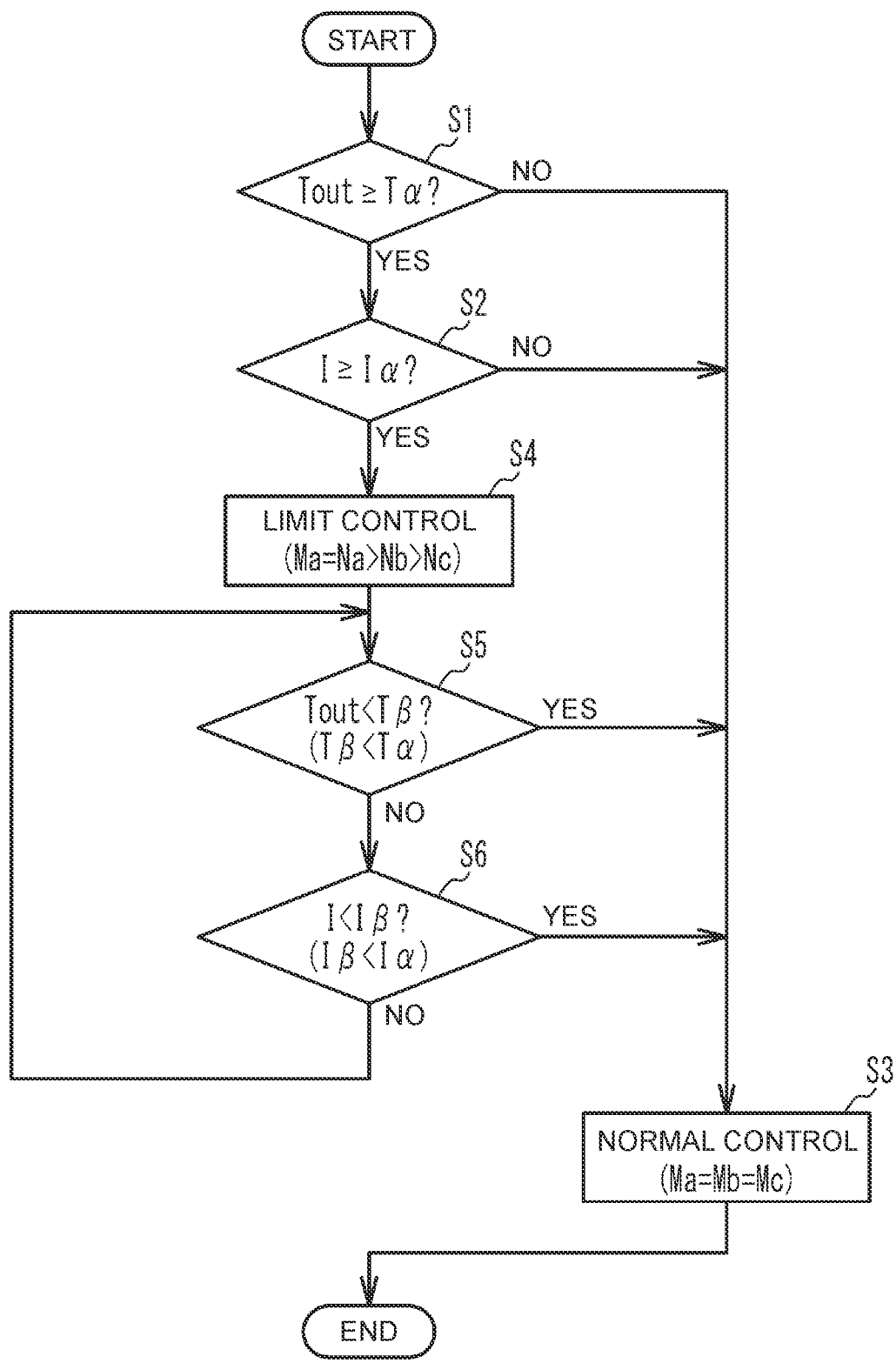
FIG. 8 is a flowchart of control in a first modification.

FIG. 8 is a flowchart of control in a first modification. FIG. 8 corresponds to FIG. 7. When Yes in steps S1 and S2, the ECU 4 starts the limit control in step S4. In step S4, the ECU 4 determines whether the detected temperature Tout is lower than a threshold Tβ (step S5). The threshold Tβ is smaller than the threshold Tα. When No in step S5, the ECU 4 determines whether the detected current value I is smaller than a threshold Iβ (step S6). The threshold Iβ is smaller than the threshold Iα. When No in steps S5 and S6, the ECU 4 performs step S5 and the subsequent steps again. That is, the ECU 4 continues the limit control. When Yes in step S5 or S6, the ECU 4 stops the limit control and executes the normal control (step S3).

As described above, for example, the ECU 4 executes the limit control when the detected temperature Tout is equal to or higher than the threshold Tα and the detected current value I is equal to or higher than the threshold Iα (Yes in steps S1 and S2). Even when the ECU 4 executes the limit control, the ECU 4 will not switch the control to the normal control unless the detected temperature Tout becomes lower than the threshold Tβ that is smaller than the threshold Tα (Yes in step S5) or the detected current value I becomes smaller than the threshold Iβ that is smaller than the threshold Iα (Yes in step S6). Hunting is thus reduced. Namely, the control is less likely to be frequently switched between the normal control and the limit control within a short time.

The detected temperature Tout being lower than the threshold Tβ and the detected current value I being smaller than the threshold Iβ are an example of the stop condition for stopping the limiting control. The detected temperature Tout being lower than the threshold Tβ is an example of the case where the first correlation value indicates that the temperature of the reactor 21c is lower than the second threshold that is smaller than the first threshold. Similarly, the detected current value I being smaller than the threshold Iβ is an example of the case where the first correlation value indicates that the temperature of the reactor 21c is lower than the second threshold.

In the first modification, the ECU 4 may perform steps S1 and S5 and may not perform steps S2 and S6. The ECU 4 may perform steps S2 and S6 and may not perform steps S1 and S5.

Second Modification

Figure 9:
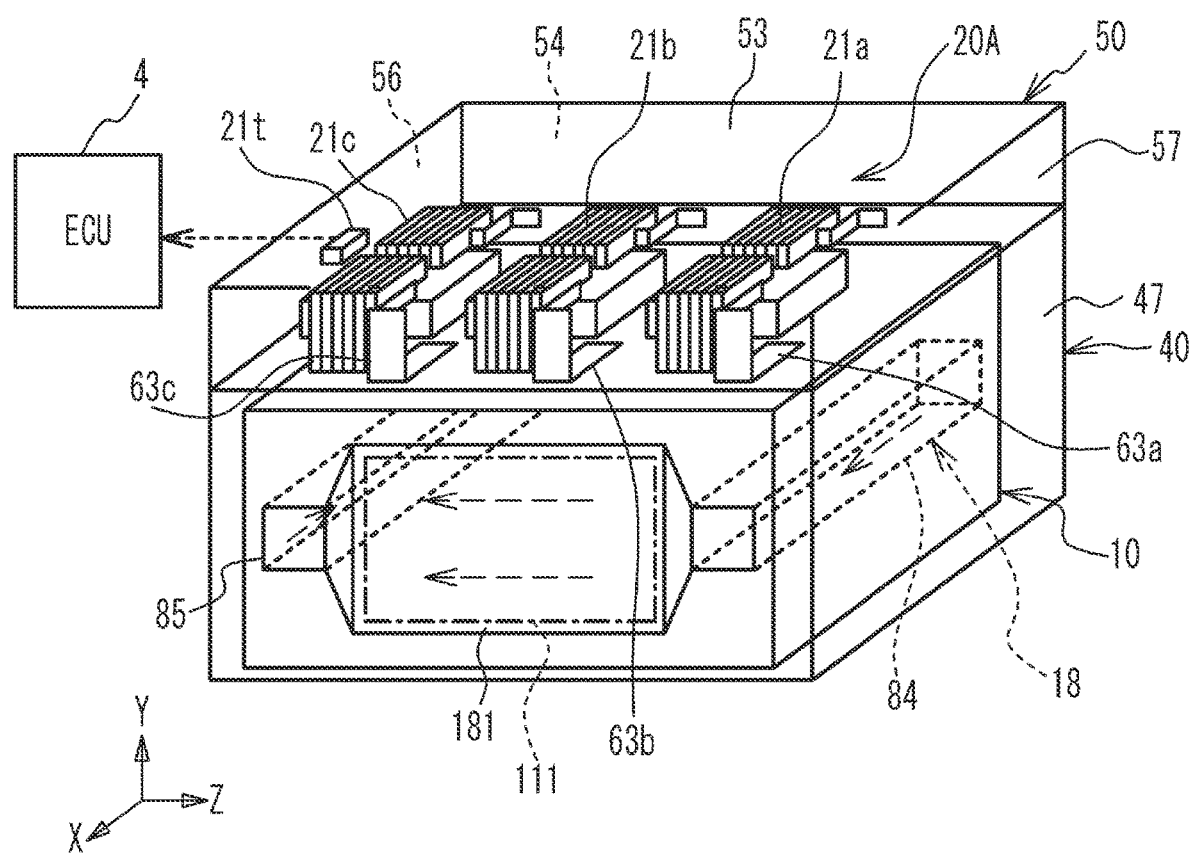
FIG. 9 illustrates an FDC in a second modification.

FIG. 9 illustrates an FDC 20A of a second modification. FIG. 9 corresponds to FIG. 5. The FDC 20A includes a temperature sensor 21t that detects the temperature of the reactor 21c. The temperature sensor 21t is a thermistor element whose electrical resistance changes with a change in temperature. However, the disclosure is not limited to this. The ECU 4 obtains a detected temperature Tc from the temperature sensor 21t.

Figure 10:
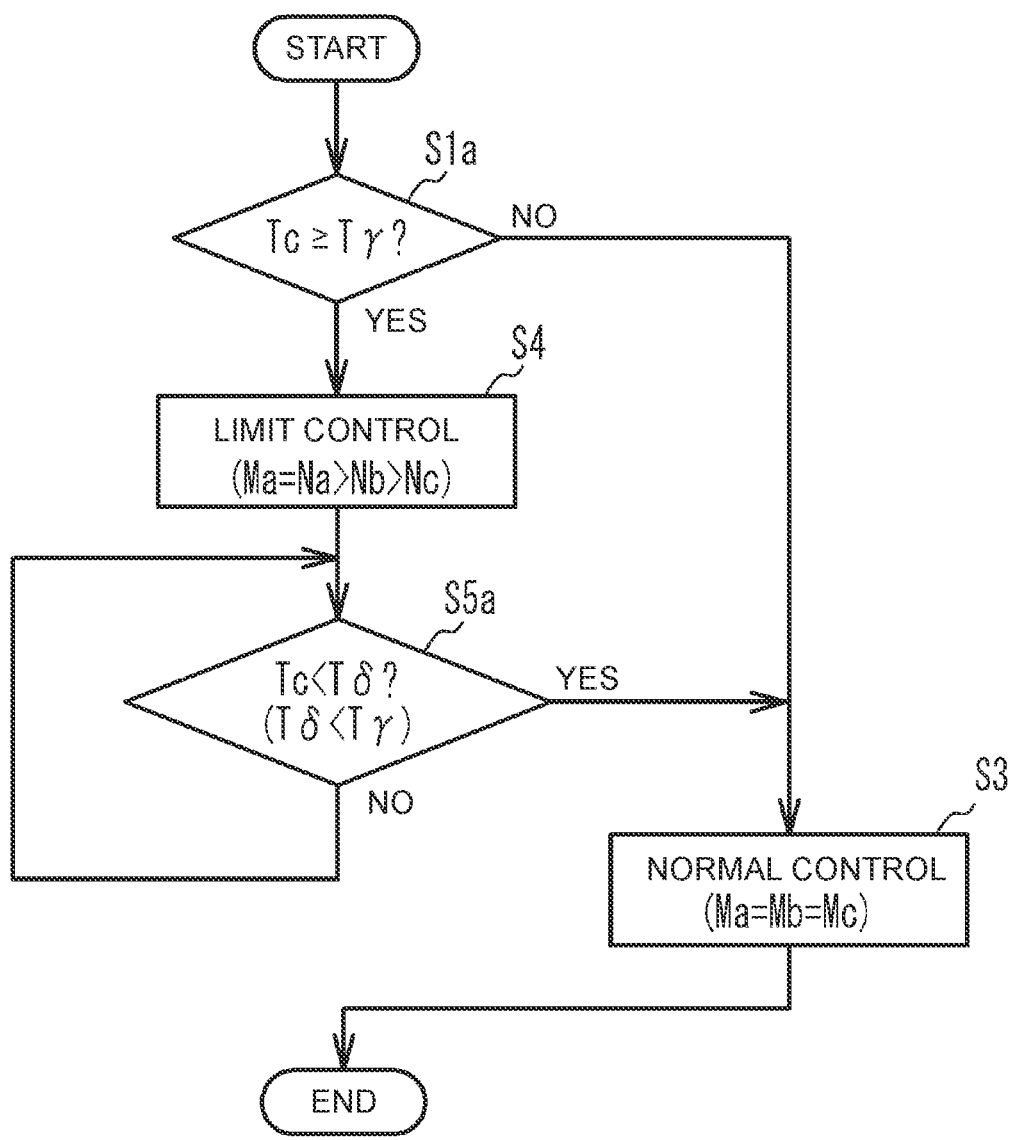
FIG. 10 is a flowchart of control in the second modification.

FIG. 10 is a flowchart of control in the second modification. The ECU 4 determines whether the detected temperature Tc from the temperature sensor 21t is equal to or higher than a threshold Tγ (step S1a). When No in step S1a, the ECU 4 executes the normal control (step S3). When Yes in step S1a, the ECU 4 executes the limit control (step S4). Since the temperature sensor 21t directly detects the temperature of the reactor 21c, the ECU 4 accurately determines whether the temperature of the reactor 21c is high enough that the ECU 4 needs to execute the limit control.

The detected temperature Tc being equal to or higher than the threshold Tγ is an example of the execution condition for executing the limit control. The detected temperature Tc is an example of the first correlation value. The detected temperature Tc being equal to or higher than the threshold Tγ is an example of the case where the first correlation value indicates that the temperature of the reactor 21c is equal to or higher than the first threshold.

When Yes in step S1a, the ECU 4 starts the limit control in step S4. The ECU 4 determines whether the detected temperature Tc is lower than a threshold Tδ (step S5a). The threshold Tδ is smaller than the threshold Tγ. When No in step S5a, the ECU 4 performs step S5a again. That is, the ECU 4 continues the limit control. When Yes in step S5a, the ECU 4 stops the limit control and executes the normal control (step S3). The detected temperature Tc being lower than the threshold Tδ is an example of the stop condition for stopping the limit control. The detected temperature Tc being lower than the threshold Tδ is an example of the case where the first correlation value indicates that the temperature of the reactor 21c is lower than the second threshold.

The temperature sensor 21t directly detects the temperature of the reactor 21c. However, the disclosure is not limited to this. For example, the temperature sensor 21t may directly detect the temperature of the bus bar 63c connected to the reactor 21c. The higher the temperature of the FC 10 is, the more the bus bar 63c is likely to become hot as the heat is transferred from the FC 10 to the bus bar 63c via the reactor 21c. Moreover, the larger the current value flowing through the reactor 21c is, the larger the current value flowing through the bus bar 63c is and the hotter the bus bar 63c becomes as the bus bar 63c itself also generates heat. In this case as well, the temperature of the bus bar 63c detected by the temperature sensor 21t is an example of the first correlation value. The temperature sensor 21t may detect the temperature around the reactor 21c which can be regarded as substantially equal to the temperature of the reactor 21c.

The execution condition for the restriction control may include step S1a and at least one of steps S1 and S2 described above. In this case, even when there is a detection error of the temperature sensor 21t, the ECU 4 can accurately determine whether the ECU 4 needs to execute the limit control.

Third Modification

Figure 11:
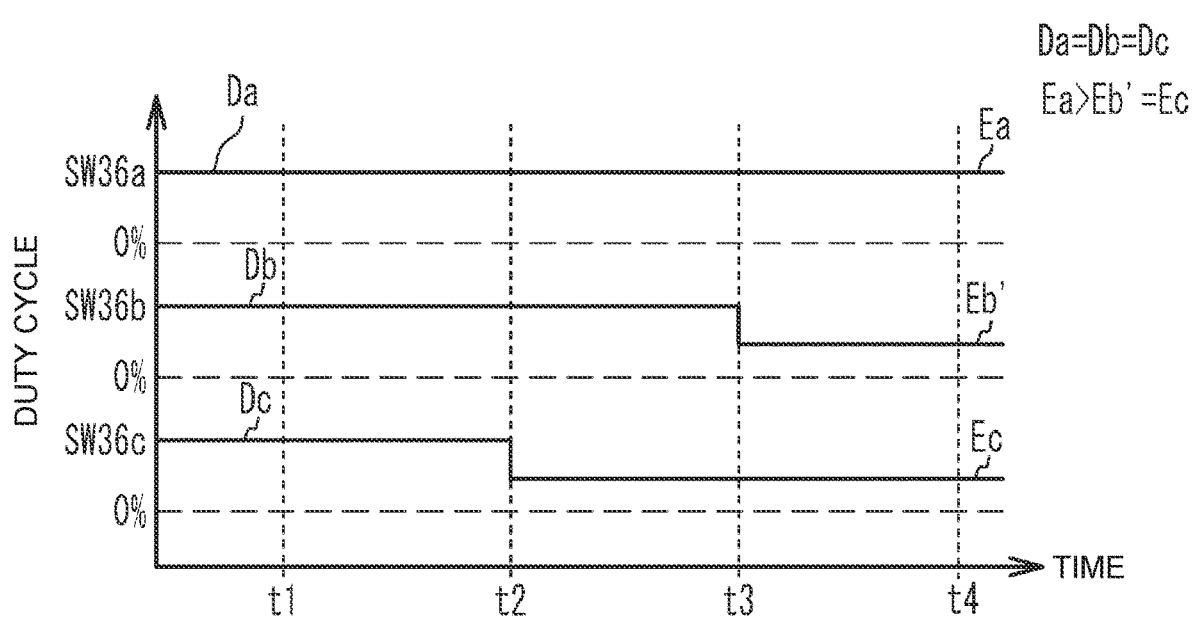
FIG. 11 is a timing chart illustrating how the duty cycles of the switching elements change during limit control in a third modification.

Limit control of a third modification will be described. FIG. 11 is a timing chart illustrating how the duty cycles of the switching elements 36a to 36c change during the limit control of the third modification. FIG. 11 illustrates how the duty cycles change when the control is switched from the normal control to the limit control under the same operating conditions. When Yes in steps S1 and S2, the ECU 4 switches the control from the normal control to the limit control. When the ECU 4 switches the control from the normal control to the limit control at time t1, the ECU 4 controls the duty cycles of the switching elements 36a to 36c to the ratios Da to Dc, respectively, during the period from time t1 to time t2. At time t2, the ECU 4 switches only the duty cycle of the switching element 36c from the ratio Dc to the ratio Ec. Accordingly, during the period from time t2 to t3 described below, the ratio Ec is smaller than the ratios Da, Db, and the average value of the current Ic is smaller than the average values of the currents Ia, Ib. At time t3, the ECU 4 switches the duty cycle of the switching element 36b from the ratio Db to a ratio Eb'. The ratio Eb' has the same value as the ratio Ec. Accordingly, during the period from time t3 to time t4 described below, the ratios Eb', Ec are smaller than the ratio Da, and the average values of the currents Ib, Ic are smaller than the average value of the current Ia. At time t4, the ECU 4 switches the duty cycle of the switching element 36a from the ratio Da to the ratio Ea. In this modification, the ratio Ea has the same value as the ratio Da. Accordingly, after time t3, the average values of the currents Ib, Ic are smaller than the average value of the current Ia as long as the limit control is continued. For example, the period from time t1 to time t2 is 6 minutes, the period from time t1 to time t3 is 8 minutes, and the period from time t1 to time t4 is 10 minutes. The period from time t1 to time t2 corresponds to the second continuous operation period, and the period from time t1 to time t4 corresponds to the first continuous operation period.

As described above, the continuous operation period during which the duty cycle of the switching element 36c is the ratio Dc is shorter than the continuous operation period during which the duty cycle of the switching element 36b is the ratio Db, and the continuous operation period during which the duty cycle of the switching element 36b is the ratio Db is shorter than the continuous operation period during which the duty cycle of the switching element 36a is the ratio Da. The duty cycle of the switching element 36c decreases from the ratio Dc to the ratio Ec after the continuous operation period during which the duty cycle of the switching element 36c is the ratio Dc, and the duty cycle of the switching element 36b decreases from the ratio Db to the ratio Eb' after the continuous operation period during which the duty cycle of the switching element 36b is the ratio Db. Accordingly, the amount of heat of the reactor 21c during the same period of time after time t4 as the period from time t1 to time t4 is smaller than the amount of heat of the reactor 21a during the period from time t1 to time t4. Moreover, the amount of heat of the reactor 21c during the period from time t1 to time t4 or to a time after time t4 is smaller than the amount of heat of the reactor 21a during this period. The ratio Eb' and the ratio Ec are the same. However, the continuous operation period during which the duty cycle of the switching element 36c is the ratio Dc is shorter than the continuous operation period during which the duty cycle of the switching element 36b is the ratio Db. Accordingly, the amount of heat of the reactor 21c during the same period of time after time t4 as the period from time t1 to time t4 is smaller than the amount of heat of the reactor 21b during the period from time t1 to time t4. Moreover, the amount of heat of the reactor 21c during the period from time t1 to time t4 or to a time after time t4 is smaller than the amount of heat of the reactor 21b during this period. The period from time t1 to time t4 is an example of the period of the ON-OFF cycles of the switching elements 36a to 36c.

As described above, the duty cycle of the switching element 36c connected to the reactor 21c that is most likely to become hot among the reactors 21a to 21c is first reduced, and then the duty cycle of the switching element 36b is reduced. This configuration reduces a decrease in electric power that is supplied to the INV 9, as compared to the case where the duty cycle of the switching element 36b is reduced simultaneously with the duty cycle of the switching element 36c at time t2.

In the third modification, the duty cycle of the switching element 36b may be set to the ratio Eb that is larger than the ratio Ec and smaller than the ratio Ea, instead of the ratio Eb' having the same value as the ratio Ec.

Fourth Modification

Figure 12:
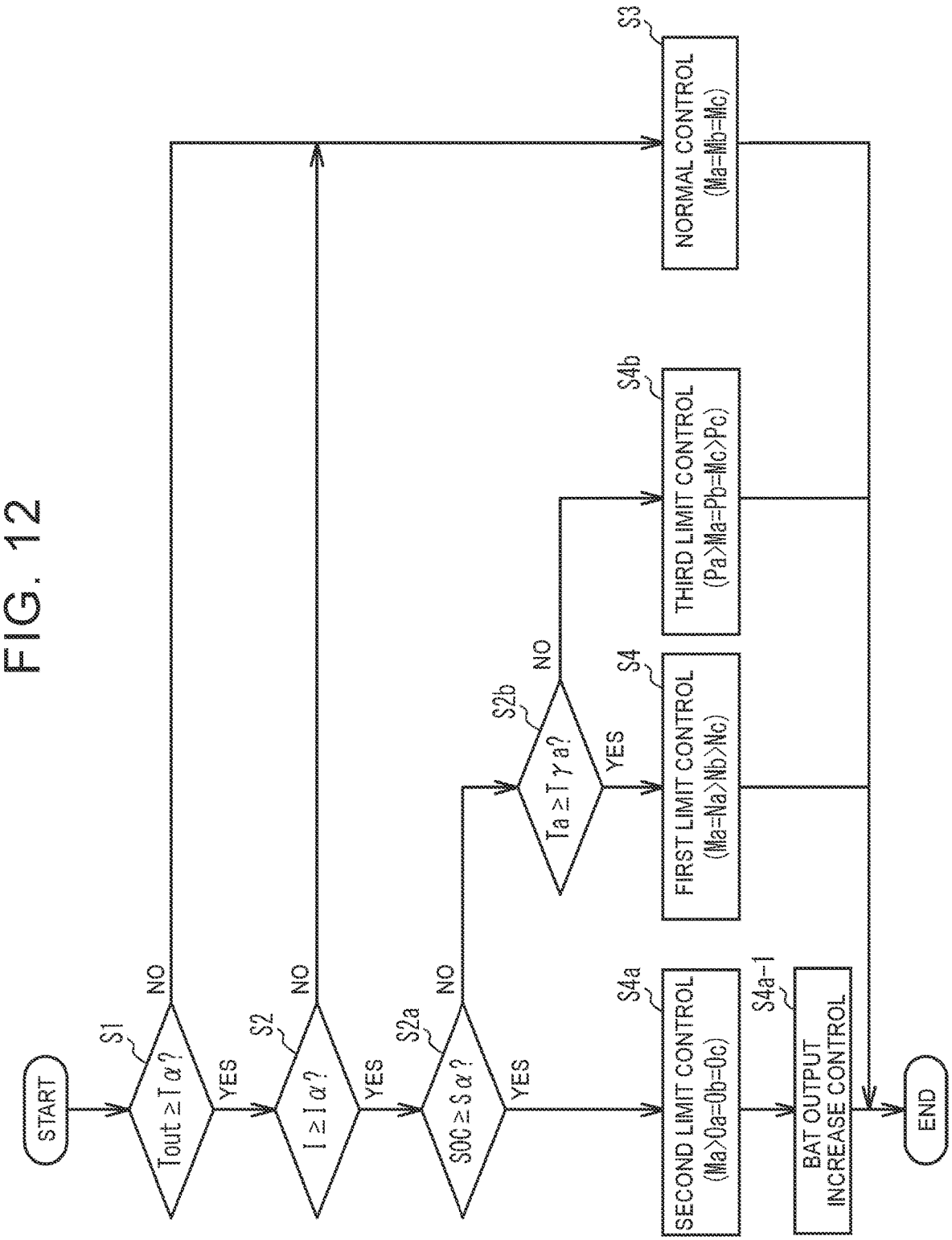
FIG. 12 is a flowchart of control in a fourth modification.

FIG. 12 is a flowchart of control of a fourth modification. In the fourth modification, the limit control in step S4 described above is referred to as first limit control for convenience of description. When Yes in steps S1 and S2, the ECU 4 obtains the SOC and determines whether the SOC is equal to or higher than a threshold Sα (step S2a). When Yes in step S2a, the ECU 4 executes second limit control (step S4a). In the second limit control, fluctuation of the current that is supplied to the INV 9 is reduced more than in the first limit control.

Figure 13A:
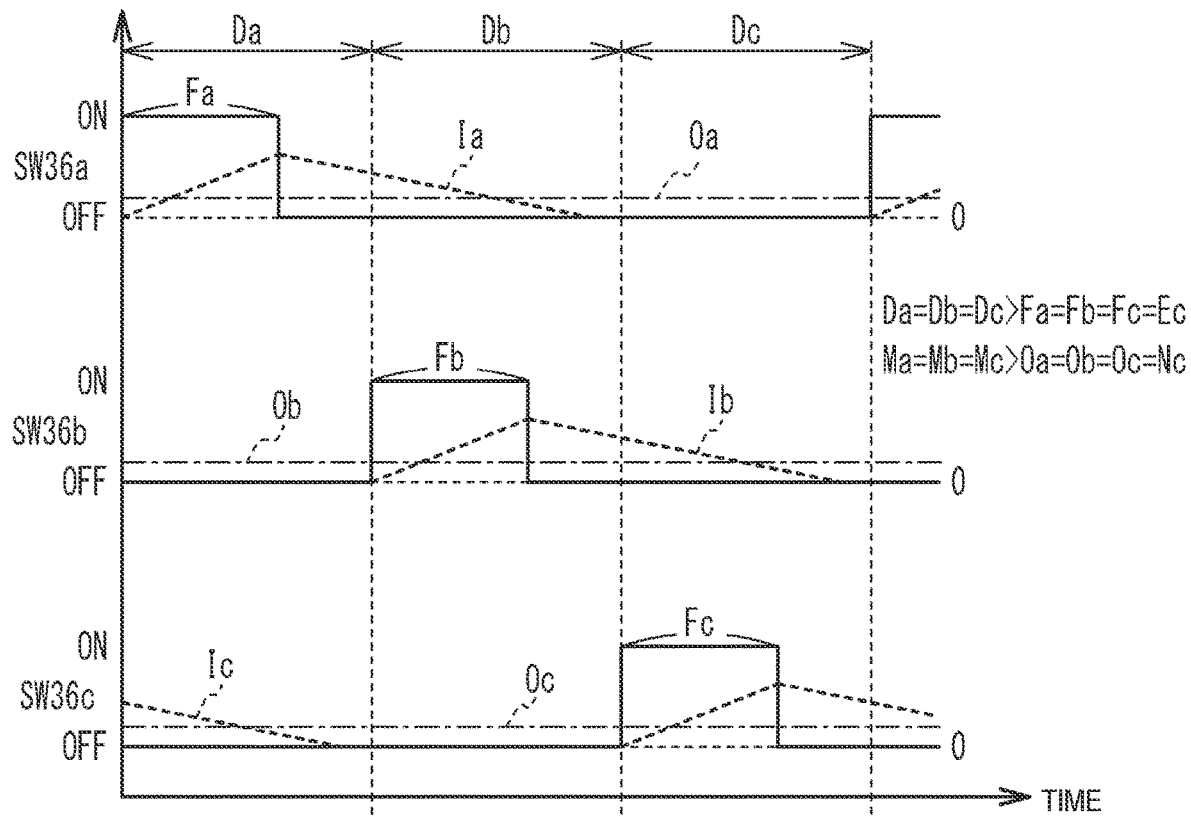
FIG. 13A is a timing chart of second limit control.

FIG. 13A is a timing chart of the second limit control. The duty cycles of the switching elements 36a to 36c are set to the ratios Fa to Fc (%). The ratios Fa to Fc have the same value, are smaller than the ratios Da to Dc shown in FIG. 6A, and have the same value as the ratio Ec shown in FIG. 6B. Accordingly, average values Oa to Oc of the currents Ia to Ic are the same value, are smaller than the average values Ma to Mc shown in FIG. 6A, and are the same value as the average value Nc shown in FIG. 6B. A current that is supplied to the INV 9 through these reactors 21a to 21c is a combined current of the currents Ia to Ic. The average values Oa to Oc in the second limit control are the same value. In other words, the difference between the average values Oa, Oc in the second limit control is smaller than the difference between the average values Na, Nc in the first limit control. When the difference between the average values Na, Nc is large as in the first limit control, the current that is supplied to the INV 9 tends to have large ripples because the current that is supplied to the INV 9 is a combined current of the currents Ia to Ic. An increase in such a ripple current is reduced in the second limit control. Moreover, since the average values Oa to Oc are the same value as the average value Nc, not only an increase in temperature of the reactor 21c but also an increase in temperature of the reactors 21a, 21b are sufficiently reduced, whereby reliability is ensured. Heat generation of the capacitor 24 which occurs when a large ripple current is applied to the capacitor 24 is also reduced.

In the second limit control, the average values Oa to Oc are the same value as the average value Nc. Accordingly, the electric power that is supplied from the FC 10 to the INV 9 via the FDC 20 is lower than in the first limit control. The ECU 4 therefore executes BAT output increase control (step S4a-1). In the BAT output increase control, the ECU 4 controls the BDC 8 so as to increase the output of the BAT 7. Specifically, in the BAT output increase control, the output power of the BAT 7 converted by the BDC 8 is increased so as to compensate for a decrease in output power of the FC 10 converted by the FDC 20 which is caused by switching the control from the normal control to the second limit control. The decrease in output power of the FC 10 converted by the FDC 20 can be calculated from the detection values of the current sensors 22a to 22c and the voltage sensor 10V shown in FIG. 4. The ECU 4 increases the output power of the BAT 7 converted by the BDC 8 by increasing the duty cycle of a switching element provided in the BDC 8. Accordingly, even when the ECU 4 executes the second limit control, desired electric power can be supplied to the INV 9. Steps S2a, S4a, and S4a-1 are an example of the process that is executed by the setting unit, the charge level obtaining unit, the control unit, and the secondary battery control which are functionally implemented by the CPU, the ROM, and the RAM of the ECU 4 of the fourth modification.

When No in step S2a, the ECU 4 determines whether the temperature Ta of the reactor 21a is equal to or higher than a threshold Tγa (step S2b). The temperature Ta of the reactor 21a is an example of the second correlation value. The temperature Ta of the reactor 21a being equal to or higher than the threshold Tγa is an example of the case where the second correlation value indicates that the temperature of the reactor 21a is equal to or higher than the third threshold. For example, the temperature Ta of the reactor 21a may be estimated based on at least one of the detected temperature Tout of the cooling water discharged from the FC 10 and the detected current value I of the FC 10. The reactor 21a does not receive so much heat from the FC 10 as the reactor 21c. However, the higher the detected temperature Tout is, that is, the higher the temperature of the FC 10 is, the more the temperature Ta of the reactor 21a increases. Moreover, the larger the detected current value I is, the more the average value of the current Ia flowing through the reactor 21a increases. The temperature Ta may be estimated based on the detection value of the current sensor 22a that detects the current flowing through the reactor 21a. Like, e.g., the temperature sensor 21t shown in FIG. 9, a temperature sensor may further be provided near the reactor 21a, and the temperature Ta may be obtained from the detection value of this temperature sensor.

When Yes in step S2b, that is, when the temperature Ta of the reactor 21a is relatively high, the ECU 4 executes the first limit control described above (step S4). When No in step S2b, that is, when the temperature Ta of the reactor 21a is relatively low, the ECU 4 executes third limit control (step S4b). In the third limit control, larger electric power is supplied to the INV 9 than in the first limit control. Steps S2b and S4b are an example of the process that is executed by the second obtaining unit, the control unit, and the secondary battery control unit which are functionally implemented by the CPU, the ROM, and the RAM of the ECU 4 of the fourth modification.

Figure 13B:
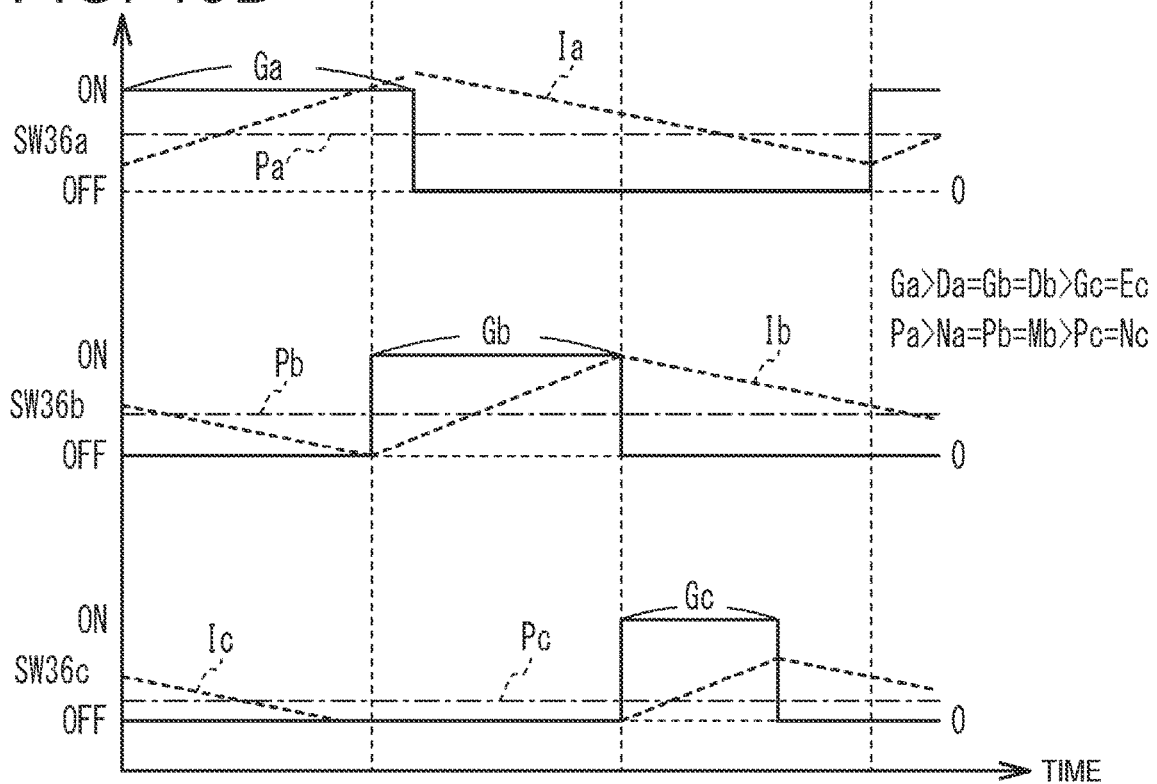
FIG. 13B is a timing chart of third limit control.

FIG. 13B is a timing chart of the third limit control. The duty cycles of the switching elements 36a to 36c are set to ratios Ga to Gc (%), respectively. The ratio Gb is smaller than the ratio Ga, the ratio Gc is smaller than the ratio Gb, and the ratio Gb has the same value as the ratio Db shown in FIG. 6A. The ratio Gc has the same value as the ratio Ec shown in FIG. 6B. Accordingly, an average value Pb (A) of the current Ib is the same value as the average value Mb shown in FIG. 6A, and an average value Pc (A) of the current Ic is the same value as the average value Nc shown in FIG. 6B. The ratio Ga is larger than the ratio Da. An average value Pa (A) of the current Ia is therefore larger than the average value Ma shown in FIG. 6A. As described above, in the third limit control, the average value Pa of the current Ia flowing through the reactor 21a is larger than the average value Ma in the normal control and is larger than the average value Na in the first limit control. This configuration reduces a decrease in electric power that is supplied from the FC 10 to the INV 9 via the FDC 20. In the third limit control, the average value Pb of the current Ib flowing through the reactor 21b is also larger than the average value Nb in the first limit control. This configuration also reduces a decrease in electric power that is supplied to the INV 9. An increase in temperature of the reactor 21c is thus reduced, and at the same time, a decrease in electric power that is supplied to the INV 9 is also reduced. In this case, the temperature of the reactor 21a becomes higher than that during the normal control. Accordingly, the ECU 4 executes the third limit control only when the temperature Ta of the reactor 21a is lower than threshold Tγa as described above.

The difference between the average value Pa in the third limit control and the average value Ma in the normal control may be the same as the difference between the average value Pc in the third limit control and the average value Mc in the normal control. The average value of the average values Pa to Pc in the third limit control may be the same value as the average value of the average values Ma to Mc in the normal control. In any case, a decrease in electric power that is supplied from the FC 10 to the INV 9 via the FDC 20 is reduced in the third limit control. The average value Pb of the current Ib in the third limit control is the same value as the average value Nb of the current Ib in the normal control. However, the disclosure is not limited to this, and the average value Pb of the current Ib in the third limit control may be smaller than the average value Nb.

The ECU 4 may not execute step S2a, the second limit control, and the BAT output increase control, and may execute the first limit control when Yes in steps S1, S2, and S2b and execute the third limit control when Yes in steps S1 and S2 and No in step S2b. Since the second limit control and the BAT output increase control are not executed, consumption of the SOC of the BAT 7 is reduced. Moreover, since the third limit control is executed, a decrease in output power that is supplied from the FC 10 to the INV 9 is reduced.

The ECU 4 may not execute step S2b and the third limit control, and may execute the second limit control and the BAT output increase control when Yes in steps S1, S2, and S2a. The ECU 4 may execute the first limit control when yes in steps S1 and S2 and No in step S2a. Since the third limit control is not executed, an increase in temperature of the reactor 21a is reduced.

The ECU 4 may not execute steps S2a and S2b and the first and second limit controls, and may execute the normal control when No in either step S1 or step S2 and execute the third limit control when Yes in steps S1 and S2. In this case, the ECU 4 does not execute the first and second limit controls but executes the third limit control when the distance between the FC 10 and the reactor 21a is sufficiently large and the temperature of the reactor 21a is kept low even though the FC 10 has a high temperature. A decrease in output power that is supplied from the FC 10 to the INV 9 is thus reduced, and at the same time, an increase in temperature of the reactor 21c is also reduced.

In the second limit control as well, the duty cycles may be controlled as in the third modification. For example, when switching the control from the normal control to the second limit control, the ECU 4 may reduce the duty cycle of the switching element 36c from the ratio Dc to the ratio Fc after a predetermined period from the time the ECU 4 determines Yes in steps S1, S2, and S2a, then reduce the duty cycle of the switching element 36b from the ratio Db to the ratio Fb and subsequently reduce the duty cycle of the switching element 36a from the ratio Da to the ratio Fa. In this case as well, the continuous operation period during which the duty cycle of the switching element 36c is the ratio Dc is shorter than the continuous operation period during which the duty cycle of the switching element 36b is the ratio Db, and the continuous operation period during which the duty cycle of the switching element 36b is the ratio Db is shorter than the continuous operation period during which the duty cycle of the switching element 36a is the ratio Da. The amount of heat of the reactor 21c can thus be made smaller than the amount of heat of the reactor 21b, and the amount of heat of the reactor 21b can be made smaller than the amount of heat of the reactor 21a. In this case, for example, the BAT output increase control may be started after the duty cycle of the switching element 36a decreases from the ratio Da to the ratio Fa, or may be started after the duty cycle of the switching element 36b decreases from the ratio Db to the ratio Fb and before the duty cycle of the switching element 36a decreases from the ratio Da to the ratio Fa.

In the third limit control as well, the duty cycles may be controlled as in the third modification. For example, when switching the control from the normal control to the third limit control, the ECU 4 may reduce the duty cycle of the switching element 36c from the ratio Dc to the ratio Gc after a predetermined period from the time the ECU 4 determines Yes in steps S1 and S2 and determines No in steps S2a and S2b, then reduce the duty cycle of the switching element 36b from the ratio Db to the ratio Gb and subsequently reduce the duty cycle of the switching element 36a from the ratio Da to the ratio Ga. In this case as well, the amount of heat of the reactor 21c can be made smaller than the amount of heat of the reactor 21b, and the amount of heat of the reactor 21b can be made smaller than the amount of heat of the reactor 21a.

Others

As shown in FIG. 5, the reactors 21a to 21c are arranged so as to be located at substantially the same position in the X direction and located next to each other in the Z direction.

However, the disclosure is not limited to this. The reactors 21a to 21c may be arranged so as to be located at different positions in the X direction.

The reactors 21a to 21c face the same upper surface of the FC 10. However, the disclosure is not limited to this. For example, of the six surfaces of the FC 10, the reactors 21a to 21c need only face any of the four surfaces of the FC 10 other than the surfaces over which the end plate 16 and the pressure plate 15 are provided and be located at such positions that at least the reactor 21c receive heat from the FC 10.

The reactors may face different surfaces of the FC 10. For example, the reactor 21a may face the side surface on the cooling water supply manifold 84 side of the FC 10 which is parallel to the XY plane, the reactor 21b may face the upper or lower surface of the FC 10 which is parallel to the XZ plane, and the reactor 21c may face the side surface on the cooling water discharge manifold 85 side of the FC 10 which is parallel to the XY plane. Alternatively, the reactors 21a, 21b may face the side surface on the cooling water supply manifold 84 side of the FC 10 which is parallel to the XY plane, and the reactor 21c may face the side surface on the cooling water discharge manifold 85 of the FC 10 which is parallel to the XY plane.

When the reactor 21c is disposed at such a position that it receives heat from the FC 10, at least one of the reactors 21a, 21b may be disposed at such a position that it does not receive heat from the FC 10. For example, the reactors 21a, 21b may be disposed far away from the FC 10.

In the above embodiment, the FC case 40 and the FDC case 50 are combined into a single case to accommodate the FC 10 and the FDC 20. However, the disclosure is not limited to this. For example, the stack case and the converter case may not be combined into a single case and may be disposed so close to each other that the reactors 21a to 21c receive the heat of the FC 10 through a wall of the stack case or a wall of the converter case. For example, the stack case and the converter case may be disposed in this manner when there is a limitation on mounting space in the vehicle. Although the reactor 21c is disposed at such a position that it receives heat from the FC 10, at least one of the reactors 21a, 21b may be disposed at such a position that it does not receive heat from the FC 10.

The FDC 20 that boosts the output voltage of the FC 10 is described as an example of the power converter. However, the power converter is not limited to this, and may be a buck converter or a buck-boost converter that can boost and step down the output voltage of the FC 10.

A plurality of magnetic coupling reactors may be used instead of the three reactors 21a to 21c. In the magnetic coupling reactor, coils are wound around two legs of a core that is, e.g., an annular magnetic body, and this pair of coils is magnetically coupled together. The pair of coils is wound around the core so that the magnetic flux generated by a current flowing through one of the coils and a magnetic flux generated by a current flowing through the other coil cancel each other out. In this case as well, in the limit control, the duty cycles of switching elements connected to the pairs of coils of the magnetic coupling reactors may be controlled so that the currents flowing through the pair of coils of one of the magnetic coupling reactors which is most likely to become hot have the smallest value. In this case, the duty cycles of the switching elements connected to the pair of coils may be set to the same value so that the currents flowing through the pair of coils magnetically coupled to each other have the same value. Loss in the pair of coils wound around the core so that the magnetic fluxes cancels each other out can be reduced by switching on and off the switching elements connected to the pair of coils with a phase difference of 180 degrees.

The embodiment and the modifications are described with respect to an example in which the FDC 20 includes the three sets of reactors 21a to 21c and switching elements 36a to 36c. However, the disclosure is not limited to this. For example, the FDC 20 may include any number of sets of reactors and switching elements The FDC 20 may include two sets of reactors and switching elements or four sets of reactors and switching elements.

The embodiment and the modifications are described with respect to an example in which the control device that controls the FDC 20 is the ECU 4 that comprehensively controls the entire fuel cell system 1 mounted on the vehicle. However, the disclosure is not limited to this. For example, the control device that controls the FDC 20 may be a computer that is provided separately from such an ECU and that includes a CPU that controls the FDC 20, a ROM, and a RAM.

Although the embodiments of the disclosure are described above in detail, the disclosure is not limited to such specific embodiments, and various modifications and variations may be made without departing from the sprit and scope of the disclosure described in the appended claims.

What is claimed is:

1. A control device for a power converter that converts electric power of a fuel cell stack,
   the fuel cell stack including a cell stack of a plurality of single cells and a cooling water discharge manifold through which cooling water is discharged from the cell stack, the cooling water discharge manifold being a through hole extending through the cell stack in a direction in which the single cells are stacked,
   the power converter including a first reactor and a second reactor which are connected in parallel with each other to the fuel cell stack, a first switching element connected to the first reactor, and a second switching element connected to the second reactor, and
   the second reactor being located closer to the cooling water discharge manifold than the first reactor is, the control device configured to:
   set a first duty cycle of the first switching element and a second duty cycle of the second switching element; and
   execute limit control in which, by controlling the setting of the first duty cycle and the second duty cycle, a second amount of heat that is generated by the second reactor due to a second current flowing through the second reactor is limited to a value smaller than a first amount of heat that is generated by the first reactor due to a first current flowing through the first reactor within a period of at least a plurality of ON-OFF cycles of the first switching element and the second switching element.

2. The control device according to claim 1, in the limit control, configured to make an average value of the second current smaller than an average value of the first current in each ON-OFF cycle of the first switching element and the second switching element.

3. The control device according to claim 1, in the limit control, configured to:
   make a second continuous operation period shorter than a first continuous operation period within the period of the ON-OFF cycles of the first switching element and the second switching element; and
   reduce the second duty cycle after the second continuous operation period, the first continuous operation period being a period during which the first duty cycle is a predetermined value, and the second continuous operation period being a period during which the second duty cycle is the predetermined value.

4. The control device according to claim 1, configured to:
obtain a first correlation value that correlates with a temperature of the second reactor;
execute the limit control when an execution condition is satisfied;
execute normal control when the execution condition is not satisfied; and
in the limit control, reduce the second duty cycle to a value smaller than in the normal control, the execution condition being that the first correlation value indicates that the temperature of the second reactor is equal to or higher than a first threshold.

5. The control device according to claim 4, configured to stop the limit control and execute the normal control when a predetermined stop condition is satisfied during the limit control, wherein
the stop condition includes a case where the first correlation value indicates that the temperature of the second reactor is lower than a second threshold that is smaller than the first threshold.

6. The control device according to claim 4, wherein
the first correlation value includes at least one of a temperature of the fuel cell stack, a temperature of the cooling water that cools the fuel cell stack, an output current value of the fuel cell stack, an average value of the second current, and a detection value of a temperature sensor provided for the second reactor.

7. The control device according to claim 1, configured to:
control another power converter that converts electric power of a secondary battery and supplies the converted electric power to a load device to which electric power of the fuel cell stack converted by the power converter is supplied;
obtain a charge level of the secondary battery;
in the limit control, reduce the first duty cycle in a case where the charge level is equal to or higher than a charge level threshold to a value smaller than in a case where the charge level is lower than the charge level threshold, and thus reduce a difference between the first current and the second current in the case where the charge level is equal to or higher than the charge level threshold to a value smaller than in the case where the charge level is lower than the charge level threshold; and in the limit control, increase the electric power of the secondary battery converted by the other power converter in the case where the charge level is equal to or higher than the charge level threshold to a value larger than in the case where the charge level is lower than the charge level threshold.

8. The control device according to claim 1, configured to:
obtain a second correlation value that correlates with a temperature of the first reactor; and
in the limit control, increase the first duty cycle in a case where the second correlation value indicates that the temperature of the first reactor is lower than the second threshold to a value larger than in a case where the second correlation value indicates that the temperature of the first reactor is equal to or higher than the second threshold.

9. The control device according to claim 1, wherein
the power converter includes a third reactor connected in parallel with the first and second reactors to the fuel cell stack, and a third switching element connected to the third reactor,
the third reactor is located closer to the cooling water discharge manifold than the first reactor is, and is located farther away from the cooling water discharge manifold than the second reactor is, and the control device configured to:
set a third duty cycle of the third switching element; and
in the limit control, control the setting of the first duty cycle, the second duty cycle, and the third duty cycle to control a third amount of heat that is generated by the third reactor due to a third current flowing through the third reactor to a value smaller than the first amount of heat and larger than the second amount of heat within a period of at least a plurality of ON-OFF cycles of the first switching element, the second switching element, and the third switching element.

10. The control device according to claim 1, wherein
the fuel cell stack and the power converter are accommodated in an integral case.

11. A fuel cell system, comprising:
the fuel cell stack;
the power converter; and
the control device for the power converter according to claim 1.

* * * * *